United States Patent
Futaki et al.

(10) Patent No.: US 9,961,670 B2
(45) Date of Patent: *May 1, 2018

(54) RADIO COMMUNICATION SYSTEM, METHOD, PROGRAM, BASE STATION APPARATUS, MULTI-CELL/MULTICAST COOPERATION CONTROL APPARATUS

(71) Applicant: NEC CORPORATION, Tokyo (JP)

(72) Inventors: Hisashi Futaki, Tokyo (JP); Kojiro Hamabe, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/428,676

(22) Filed: Feb. 9, 2017

(65) Prior Publication Data
US 2017/0156129 A1   Jun. 1, 2017

Related U.S. Application Data

(60) Continuation of application No. 13/857,266, filed on Apr. 5, 2013, now Pat. No. 9,609,627, which is a
(Continued)

(30) Foreign Application Priority Data

Jul. 1, 2008 (JP) ................ 2008-172798

(51) Int. Cl.
*H04W 4/00*   (2009.01)
*H04W 72/00*  (2009.01)
(Continued)

(52) U.S. Cl.
CPC ......... *H04W 72/005* (2013.01); *H04L 5/0032* (2013.01); *H04W 28/26* (2013.01);
(Continued)

(58) Field of Classification Search
None
See application file for complete search history.

(56) References Cited

U.S. PATENT DOCUMENTS

2008/0101270 A1   5/2008 Kekki et al.
2008/0274759 A1  11/2008 Chen et al.
(Continued)

FOREIGN PATENT DOCUMENTS

| CN | 101106391 A | 1/2008 |
|----|-------------|--------|
| CN | 101193332 A | 6/2008 |
| WO | 2007/129537 A1 | 11/2007 |

OTHER PUBLICATIONS

3rd Generation Partnership Project; Technical Specification Group Radio Access Network; User Equipment (UE) procedures in idle mode and procedures for cell reselection in connected mode, 3GPP TS 25.304 V8.2.0, May 2008.
(Continued)

*Primary Examiner* — Bob Phunkulh
(74) *Attorney, Agent, or Firm* — Sughrue Mion, PLLC

(57) ABSTRACT

Disclosed is a radio communication system in which transmission parameters, such as MCS of MBSFN, the number of subframes, and a transmission power of a reserved cell, are adaptively output, based on a unicast traffic volume in a MBSFN area, a number of terminals, and a number of cells of the MBSFN area, so that a system throughput in the MBSFN area is maximized while satisfying an MBSFN quality requirement condition.

6 Claims, 25 Drawing Sheets

Related U.S. Application Data division of application No. 13/002,290, filed as application No. PCT/JP2009/062042 on Jul. 1, 2009, now Pat. No. 9,420,563.

(51) Int. Cl.

| | |
|---|---|
| *H04L 5/00* | (2006.01) |
| *H04W 28/26* | (2009.01) |
| *H04W 52/32* | (2009.01) |
| *H04W 48/08* | (2009.01) |
| *H04W 72/04* | (2009.01) |

(52) U.S. Cl.
CPC ..... *H04W 52/327* (2013.01); *H04W 72/0433* (2013.01); *H04W 48/08* (2013.01); *H04W 72/042* (2013.01)

(56) References Cited

U.S. PATENT DOCUMENTS

| | | | |
|---|---|---|---|
| 2009/0046617 A1 | 2/2009 | Tenny et al. | |
| 2009/0147717 A1 | 6/2009 | Cai | |
| 2009/0196165 A1 | 8/2009 | Morimoto et al. | |
| 2009/0323574 A1* | 12/2009 | Koskinen | H04W 48/10 370/312 |
| 2010/0103854 A1* | 4/2010 | Lee | H04W 72/005 370/312 |
| 2010/0232340 A1* | 9/2010 | Godor | H04H 20/57 370/312 |
| 2010/0315984 A1 | 12/2010 | Wang et al. | |
| 2010/0325504 A1* | 12/2010 | Lee | H04L 1/1812 714/748 |
| 2010/0325509 A1 | 12/2010 | Kim et al. | |
| 2011/0044225 A1* | 2/2011 | Rinne | H04W 72/005 370/312 |

OTHER PUBLICATIONS

Alcatel-Lucent, E-MBMS transmission mode selection and switching [online], 3GPP TSG-RAN WG2#58bis R2-072924, Internet<RL:http://www.3gpp.org/ftp/tsg_ran/WG2_RL2/TSGR2_58bis/Docs/R2-07924.zip>, Jun. 29, 2007, pp. 1-8.
Communication dated Apr. 23, 2013 from the Japanese Patent Office in counterpart Japanese application No. 2010-519090.
Communication dated Apr. 23, 2013 from the Japanese Patent Office in counterpart Japanese application No. 2013-044326.
Communication dated Aug. 28, 2014, issued by the U.S. Patent and Trademark Office in counterpart U.S. Appl. No. 14/146,374.
Communication dated Jan. 14, 2015 from the United States Patent and Trademark Office in counterpart U.S. Appl. No. 13/857,266.
Communication dated Oct. 27, 2016, from the State Intellectual Property Office of the P.R.C., in counterpart Chinese application No. 201310108782.6.
Ericsson, "SFN Area Configuration for E-MBMS", 3GPP TSG RAN WG3 Meeting #53bis R3-061505, XP-002474731, Oct. 10, 2006, pp. 1-3.
Extended Search Report dated Jul. 5, 2013 issued by the European Patent Office in counterpart European Application No. 09773506.2.
LS on LTE-MBMS Discussions in RAN3, 3GPP TSG-RAN WG3 Meeting #54 R3-062015, Nov. 10, 2006, 3 pages total.
Mitsubishi Electric, "Additional Considerations Related to MBMS Coordination", 3GPP TSG RAN WG3 Meeting #55bis R3-070661, XP-002469093, Mar. 21, 2007, pp. 1-5.
Motorola, "MBMS Modulation and Coding Selection", 3GPP TSG RAN WG2 ad-hoc on LTE R2-061985, XP-002474733, Jun. 27, 2006, pp. 1-6.
Nokia, Nokia Siemens Networks, On MBMS service continuity, 3GPP TSG-RAN WG2 Meeting #60 R2-074853, Nov. 9, 2007, 6 pages total.
Office Action dated Aug. 6, 2013 in U.S. Appl. No. 13/002,290.
Office Action dated Feb. 6, 2013 in U.S. Appl. No. 13/002,290.
Office Action, dated Apr. 9, 2013, issued by the State Intellectual Property Office of the People's Republic of China in counterpart Chinese Application No. 2009801260179.
Qualcomm Europe, "Principles for Resource Allocation Among SFN Areas", 3GPP TSG RAN WG3 #56 R3-070962, XP-002469092, May 2, 2007, pp. 1-10.
Samsung; 3rd Generation Partnership Project; Technical Specification Group Radio Access Network; WG3 Meeting #58; SFN Management; pp. 11-15.
Tian, et al.; "A Novel SFN Broadcast Services Selection Mechanism in Wireless Cellular Networks", Wireless Communications and Networking Conference, Mar. 31, 2008, pp. 1974-1978.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300, Dec. 2007, V8.3.0.
3rd Generation Partnership Project; Radio Resource Control (RRC); Protocol specification, 3GPP TS 25.331 V8.2.0, Mar. 2008.
China Mobile, Vodafone, Qualcomm, ZTE, ASUSTek, Option for Uplink Messaging in LTE MBMS [online], 3GPP TSG-RAN WG2#60bis R2-080569, Internet<URL:http://www.3gpp.org/ftp/tsg_ran/WG2_RL2/TSGR2_60bis/Docs/R2-080569.zip, Jan. 18, 2008, pp. 1-5.
3GPP TS 36.300 V8.5.0 (May 2008), May 2008, pp. 71-79, 15 MBMS.
Communication dated Aug. 28, 2014 from the United States Patent and Trademark Office in counterpart U.S. Appl. No. 14/146,374.

* cited by examiner

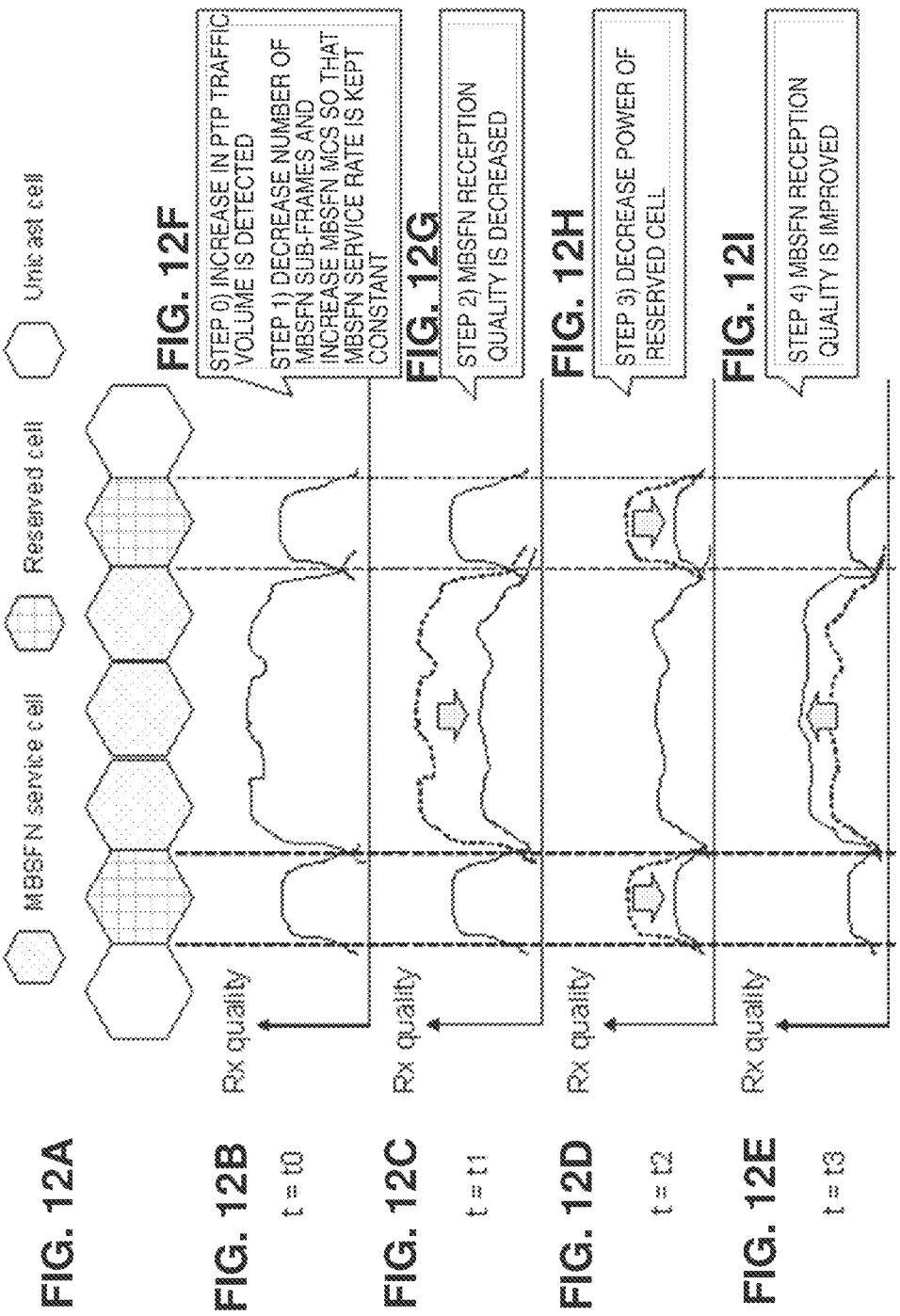

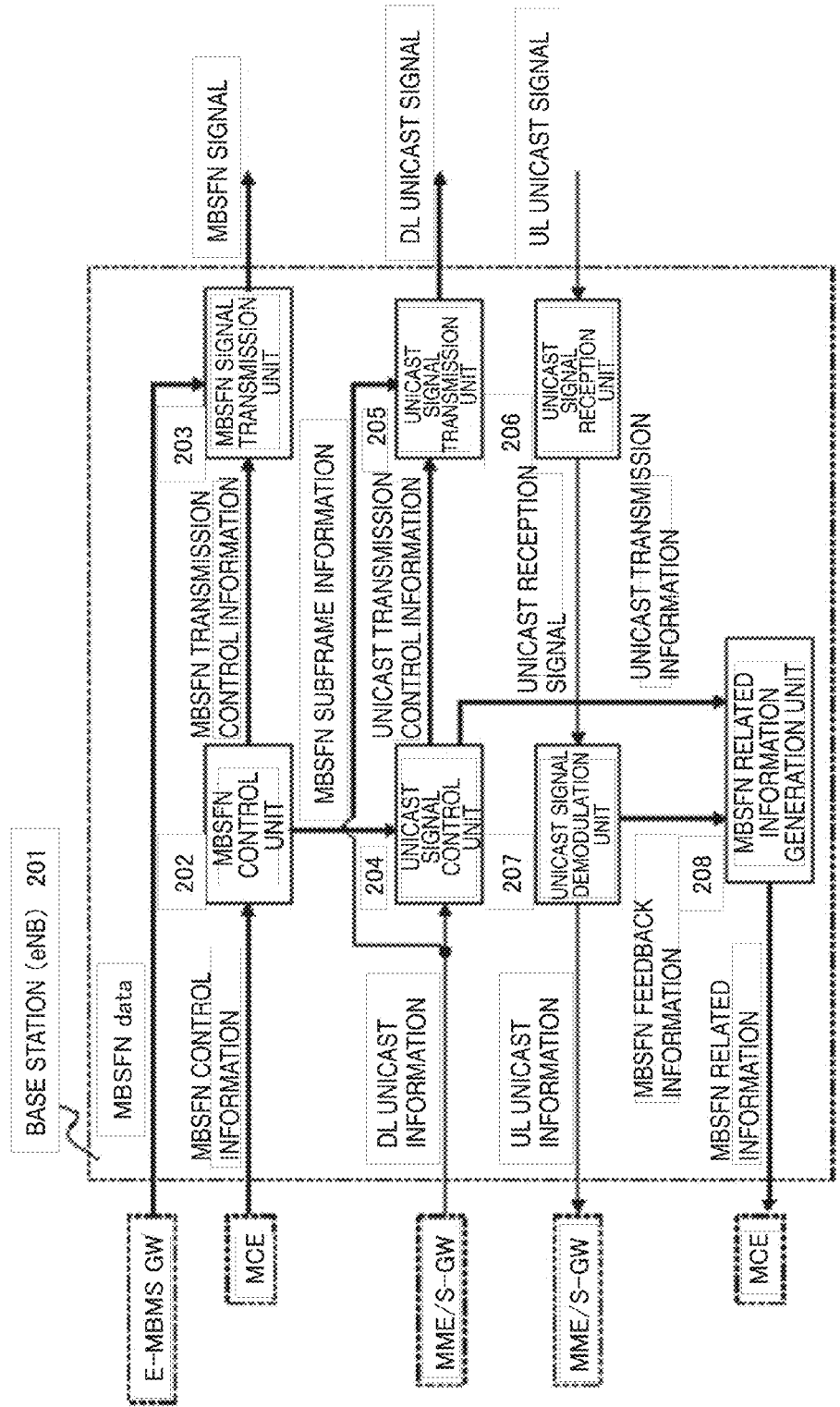

FIG. 17

| RESERVED CELL POWER | MBSFN MCS | | | | |
|---|---|---|---|---|---|
| | 1 | 2 | 3 | ... | 10 |
| 100 % | 20% | 40% | 80% | ... | 100% |
| 50 % | 10% | 20% | 40% | ... | 80% |
| 10 % | 5% | 10% | 15% | ... | 40% |
| 0 % | 0% | 2% | 5% | ... | 10% |

FIG. 18

| RESERVED CELL POWER | MBSFN MCS/ # of sub-frame | | | | |
|---|---|---|---|---|---|
| | 1/ 8 | 2/ 7 | 3/ 6 | ... | 10/ 1 |
| 100 % | 20% | 40% | 80% | ... | 100% |
| 50 % | 10% | 20% | 40% | ... | 80% |
| 10 % | 5% | 10% | 15% | ... | 40% |
| 0 % | 0% | 2% | 5% | ... | 10% |

FIG. 22

| Average PTP traffic | PTP traffic index |
|---|---|
| (0 , P1] | Low (0) |
| (P1 , P2] | Medium (1) |
| (P2 , ∞] | High (2) |

FIG. 23

| PTP traffic index | | RESERVED CELL POWER | MBSFN MCS | # of MBSFN sub-frame |
|---|---|---|---|---|
| Reserved cell | MBSFN service cell | | | |
| Low (0) | Low (0) | 100 % | 1 | 8 |
| Medium (1) | Low (0) | 80 % | 2 | 7 |
| Low (0) | Medium (1) | 60 % | 3 | 6 |
| Medium (1) | Medium (1) | 50 % | 5 | 4 |
| ... | ... | ... | ... | ... |
| High (2) | High (2) | 0 % | 10 | 1 |

FIG. 25    RELATED ART

TABLE. MBSFN OUTAGE(%), MCS,
AND RESERVED CELL TRANSMISSION POWER

| RESERVED CELL POWER | MBSFN MCS | | | | |
|---|---|---|---|---|---|
| | 1 | 2 | 3 | ... | 10 |
| 100 % | 20% | 40% | 80% | ... | 100% |
| 50 % | 10% | 20% | 40% | ... | 80% |
| 10 % | 5% | 10% | 15% | ... | 40% |
| 0 % | 0% | 2% | 5% | ... | 10% |

RADIO COMMUNICATION SYSTEM, METHOD, PROGRAM, BASE STATION APPARATUS, MULTI-CELL/MULTICAST COOPERATION CONTROL APPARATUS

CROSS REFERENCE TO RELATED APPLICATIONS

This application is a continuation application of U.S. patent application Ser. No. 13/857,266, filed Apr. 5, 2013, which is a divisional of U.S. patent application Ser. No. 13/002,290, filed Dec. 30, 2010, which is a national stage of International Application No. PCT/JP2009/062042, filed Jul. 1, 2009, claiming priority based on Japanese Patent Application No. 2008-172798, filed Jul. 1, 2008, the contents of all of which are incorporated herein by reference in their entirety.

TECHNICAL FIELD

Reference to Related Application

This application is based upon and claims the benefit of the priority of Japanese patent application No. 2008-172798 filed on Jul. 1, 2008, the disclosure of which is incorporated herein in its entirety by reference thereto.

The present invention relates to a radio communication system that performs an MBSFN (Multimedia Broadcast Multicast Service Single Frequency Network or Multicast/Broadcast over Single Frequency Network) transmission and a unicast transmission, and more particularly to a radio communication system in which two types of area, an area where an MBSFN transmission is performed and an area where a unicast transmission is performed at the same time an MBSFN transmission is performed, are mixed in an area in which MBSFN is supported.

BACKGROUND

In 3GPP (3rd Generation Partnership Project) LTE (Long Term Evolution), it has been decided to support MBSFN in which multiple base stations are synchronized to perform MBMS (Multimedia Broadcast and Multicast Service) on the same frequency.

An MBSFN area (range in which multiple base stations are synchronized to perform the same MBSFN transmission) defined by LTE is composed of the following two types of cells (Non-Patent Document 1):

Cell in which a base station performs an MBSFN transmission (MBSFN transmitting and advertising cell: hereinafter termed an "MBSFN service cell"); and Cell in which a base station does not contribute to an MBSFN transmission, but performs only a unicast or single-cell/multicast transmission is performed (MBSFN area reserved cell: hereinafter termed a "reserved cell").

Note that the terms MBSFN, unicast, and multicast include not only communications using MBSFN, unicast, and multicast respectively but also services using MBSFN, unicast, and multicast respectively.

Unicast transmission and MBSFN transmission are time-division multiplexed (TDM) on a per-subframe basis. For example, when ten subframes make up one frame and there are four MBSFN subframes, the remaining six subframes are unicast subframes.

In an MBSFN service cell, the subframes other than MBSFN subframes (subframes used for MBSFN transmission) are unicast subframes.

In a reserved cell, one of the following two types of control is performed when multiple other cells in the MBSFN area perform MBSFN transmission (MBSFN subframe transmission time period).

Decrease the transmission power and perform unicast transmission (for example, unicast transmission only to the terminals in the center of the cell is performed) or perform single-cell/multicast transmission; and Do not transmit any data.

One of the purposes of this reserved cell, provided on the boundary with other MBSFN areas or unicast cells, is to reduce interference from outside the MBSFN area and to improve coverage and outage of MBSFN.

The transmission power or the maximum of the transmission power in a reserved cell is determined by the target value of the MBSFN outage and the MBSFN MCS (Modulation and coding Scheme) using, for example, a table (decision table) that is prepared in advance.

Note that an outage represents that a user does not satisfy a service requirement condition of a communication system and corresponds, for example, to a service condition that is equal to or lower than an outage threshold of an acceptable performance of the system. This outage threshold is the minimum performance index at which the system is considered to be in an operating state. For example, when a required error rate outage, that is, an outage probability, is used, whether or not a percent of users whose required error rate exceeds the outage probability is lower than x % (for example, 5%) of entire users is a criterion at which the system is judged to be in the normal operating state.

With reference to FIG. 24 and FIG. 25, a conventional method for determining a transmission power, or the maximum of the transmission power, of a base station in a reserved cell using a table prepared in advance will be described. As shown in FIG. 24, it is assumed that there is an MBSFN area that is composed of MBSFN service cells and reserved cells and that the MBSFN area is surrounded by neighboring unicast cells.

FIG. 25 is a diagram showing an example of a table used to determine the transmission power, or the maximum of the transmission power, of a reserved cell. As shown in FIG. 25, the relation (correspondence) among the outage probability (%) of the MBSFN required error rate, MCS, and the transmission power, or the maximum of the transmission power, of a base station in a reserved cell is prepared in the memory as a table. The values of the table shown in FIG. 25 have been calculated in advance through computer simulation.

First, the following describes how to interpret the table in FIG. 25. Although not limited thereto, it is known in the radio communication that the smaller the MBSFN MCS number is, the lower a modulation rate and a coding rate are and that the larger the number is, the higher the modulation rate and the coding rate are. For example, MCS 1 corresponds to QPSK (Quadrature Phase Shift Keying) and MCS 10 corresponds to 16QAM (Quadrature Amplitude Modulation).

When the transmission power, or the maximum of the transmission power, of a base station in a reserved cell is 100% (the ratio of the transmission power to the transmission power of an MBSFN subframe is 100%, and this is the maximum transmission power), the outage probability for MBSFN MCS 1 is 20% (20 terminals out of 100 terminals cannot receive MBSFN). The outage probability (%) is 40% for MBSFN MCS 2, and this corresponds to a situation in which 40 terminals out of 100 terminals cannot receive MBSFN. The outage probability (%) is 100% for MBSFN MCS 10, and this corresponds to a situation in which 100 terminals out of 100 terminals cannot receive MBSFN.

When the transmission power, or the maximum of the transmission power, of a base station in a reserved cell is reduced to 50%, the outage probability for MBSFN MCS 1 is 10% (10 terminals out of 100 terminals cannot receive MBSFN). The outage probability for MBSFN MCS 2 (%) is 20%, and this corresponds to a situation in which 20 terminals out of 100 terminals cannot receive MBSFN. The outage probability (%) for MBSFN MCS 10 is 80%, and this corresponds to a situation in which 80 terminals out of 100 terminals cannot receive MBSFN.

When the power of a base station in a reserved cell is 0% (no data transmission), the outage probability for MBSFN MCS 1 is 0% (That the MBSFN outage probability (%) is 0% means that the percent of users (terminals) who cannot receive MBSFN is 0%). The outage probability (%) for MBSFN MCS 2 is 2%, and this corresponds to a situation in which two terminals out of 100 terminals cannot receive MBSFN. When the power of a base station in a reserved cell is 0% for MBSFN MCS 10, the outage probability (%) is 10% and this corresponds to the state in which ten terminals out of 100 terminals cannot receive MBSFN.

The MBSFN outage probability is determined based on the requirement condition for the quality of MBSFN that is actually transmitted, and, based on a volume of PTP (Point To Point) traffic in the reserved cell, the following are determined:

MBSFN MCS satisfying an outage probability; and
Transmission power, or the maximum of transmission power, for MBSFN subframes in a reserved cell (percent of MBSFN power)

Note that PTP, which is equivalent to unicast, means a dedicated communication scheme or a service by the dedicated communication scheme.

For example, if
the number of MBSFN subframes is fixed,
the target value of MBSFN outage probability is 10%, and MCS is 2,
then, it is determined by the table in FIG. 25 that the transmission power, or the maximum of the transmission power, of a base station in the reserved cell is 10% of the maximum transmission power of MBSFN.

On the other hand, if a transmission rate of MBSFN is fixed, the number of MBSFN subframes is changed so that the number is inversely proportional to the MBSFN MCS value (normally, the smaller the value is, the lower the rate). When the MBSFN MCS value is small, the number of MBSFN subframes per frame is increased.

NON-PATENT DOCUMENT 1

3GPP TSG RAN WG2, Stage 2 specification 36.300 v8 3.0
  http://www.3gpp.org/ftp/Specs/html-info/36300.htm

SUMMARY

The disclosure of Non-Patent Document 1 given above is hereby incorporated in its entirety by reference into this specification. The following analysis is given by the present invention. The following gives an analysis of the related technologies of the present invention.

In the related art described above, the power of a base station in a reserved cell is set according to the pre-set table indicating the relation among the target values of MBSFN outage target probability, MBSFN MCS, and the transmission power, or the maximum of the transmission power, of a base station in a reserved cell. Therefore, only the quality of MBSFN is considered, but not the quality of non-MBSFN. This may have an effect on the quality or the capacity of non-MBSFN.

It is an object of the present invention to provide a radio communication system, a base station apparatus, a Multi-cell/Multicast Coordination Entity (MCE), a radio communication method, and a program that allow setting to be optimally determined from the viewpoint of PTP (point-to-point) system throughput in an MBSFN area while satisfying a requirement for a MBSFN quality.

According to the present invention, there is provided a system (method, program) which receives communication status information from all or a part of a plurality of radio stations, and outputs communication control information for use in multicasting by a plurality of radio stations.

According to the present invention, there is provided a system (method, program) which receives the communication status information from a plurality of radio stations in an MBSFN area, and outputs the communication control information in the MBSFN area, the MBSFN area being an applicable range of MBSFN (Multimedia Broadcast Multicast Service Single Frequency Network) in which a plurality of radio stations are synchronized to transmit the same content on the same frequency at the same time.

According to the present invention, there is provided a base station apparatus that includes an MBSFN (Multimedia Broadcast Multicast Service Single Frequency Network) function that causes the base station apparatus to synchronize with one or more other base station apparatuses to transmit the same content on the same frequency at the same time; and a unicast function, characterized in that the base station apparatus notifies a Multi-cell/Multicast Coordination Entity (MCE) about communication status information and receives communication control information from the Multi-cell/Multicast Coordination Entity to perform MBSFN transmission or unicast or single-cell/multicast transmission.

According to the present invention, there is provided a Multi-cell/Multicast Coordination Entity (MCE) apparatus that outputs communication control information on MBSFN (Multimedia Broadcast Multicast Service Single Frequency Network) in which a plurality of base station apparatuses are synchronized to transmit the same content on the same frequency at the same time, characterized in that the Multi-cell/Multicast Coordination Entity (MCE) apparatus receives communication status information from a base station apparatus in an MBSFN area, which is an applicable range of MBSFN, and notifies the base station apparatus about the communication control information.

In the present invention, the Multi-cell/Multicast Coordination Entity (MCE) apparatus may adaptively output transmission parameters, such as the MCS of MBSFN, the number of MBSFN subframes, and a transmission power of a base station apparatus in a reserved cell, so that a system throughput of an MBSFN area is maximized while satisfying an MBSFN quality requirement condition and based on a unicast traffic volume of the MBSFN area, the number of terminals, and the number of cells of the MBSFN area.

According to the present invention, a PTP (Point-to-Point) system throughput of an MBSFN area may be maximized while satisfying an MBSFN quality requirement condition. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 12A-12I are diagrams showing an example of transmission parameter control in an MBSFN area in the first and second exemplary embodiments of the present invention.

FIG. 13 is a block diagram showing a base station in the first and second exemplary embodiments of the present invention.

FIG. 17 is a diagram showing a table used to determine transmission parameters for an MBSFN area in the first exemplary embodiment of the present invention.

FIG. 18 is a diagram showing a table used to determine transmission parameters for an MBSFN area in the first exemplary embodiment of the present invention.

FIG. 22 is a diagram showing a table used to determine transmission parameters for an MBSFN area in the second exemplary embodiment of the present invention.

FIG. 23 is a diagram showing a table used to determine transmission parameters for an MBSFN area in the second exemplary embodiment of the present invention.

FIG. 25 is a diagram showing a table used to determine transmission parameters for an MBSFN area in the related technology.

PREFERRED MODES

Figure 1:
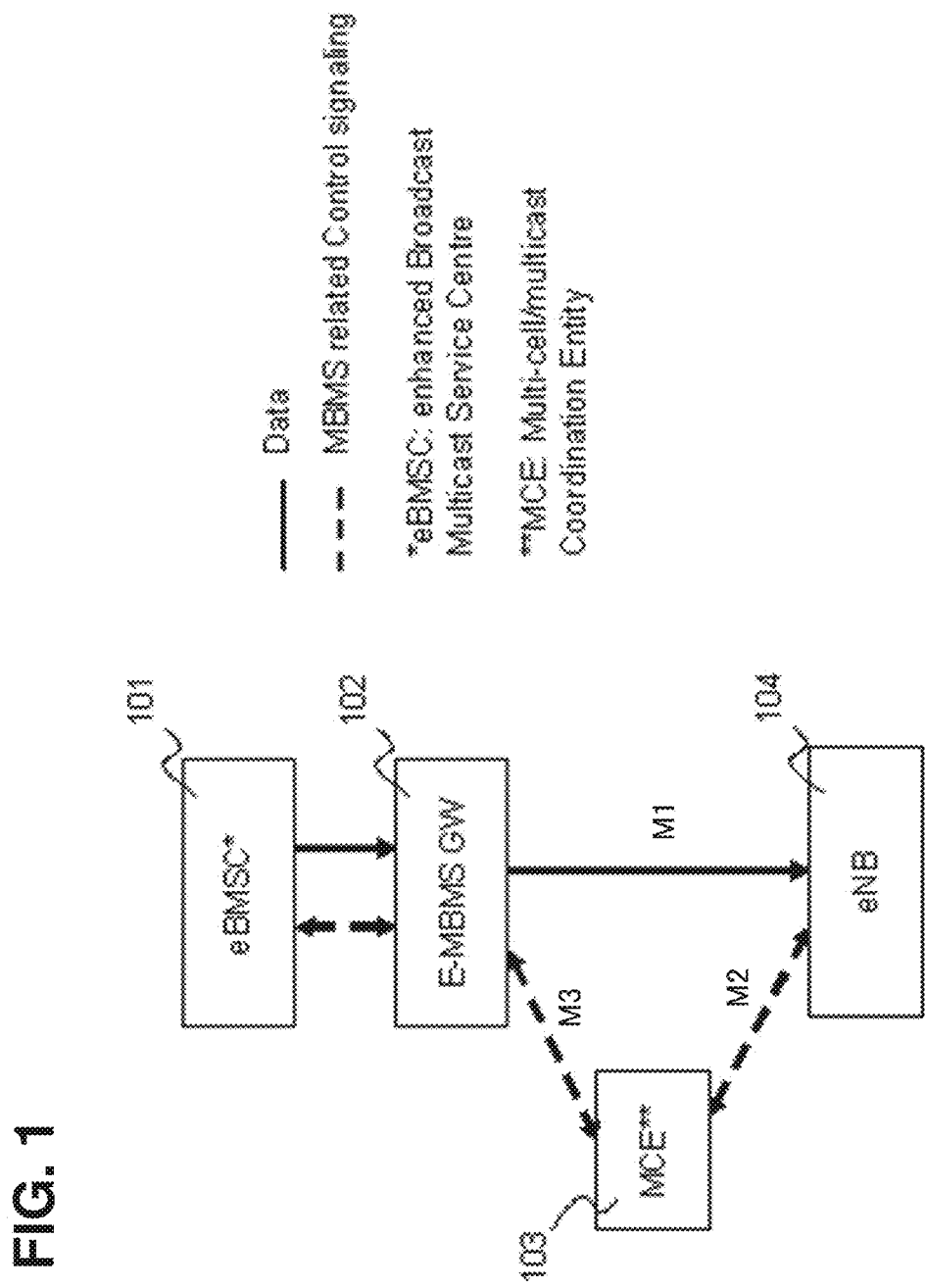
FIG. 1 is a diagram showing a first configuration example of a radio communication network apparatus in the present invention.

In the present invention, communication status information is received from a plurality of radio stations in an MBSFN area and communication control information in the MBSFN area is output, the MBSFN area being an applicable range of MBSFN (Multimedia Broadcast Multicast Service Single Frequency Network) in which a plurality of radio stations are synchronized to transmit the same content on the same frequency at the same time.

In the present invention, the MBSFN area includes
a radio station that performs both MBSFN transmission and unicast transmission, and
a radio station that does not contribute to MBSFN transmission. In the present invention, the communication control information for MBSFN transmission by the radio station that is in the MBSFN area and that performs MBSFN transmission, and the communication control information for a communication by the radio station that is in the MBSFN area but that, when MBSFN transmission is performed in the MBSFN area, does not contribute to the MBSFN transmission are output.

In the present invention, the communication status information includes at least one of
system component information,
multicast related information, and
unicast related information. In the present invention, the communication control information includes at least one of
a transmission parameter for the MBSFN area and
a cell type of each cell belonging to the MBSFN area. In the present invention, the communication control information is output so that an MBSFN requirement condition is satisfied. If multiple levels are set for the requirement condition, the communication control information is output so that at least the lowest-level requirement condition is satisfied.

In a radio communication system, a base station apparatus, and a Multi-cell/Multicast Coordination Entity (MCE) provided by the present invention, a transmission parameter for an MBSFN subframe in an MBSFN area is adaptively output based on at least one of
the number of base stations that perform MBSFN transmission,
the number of areas served by a base station that performs MBSFN transmission,
a size of an area served by a base station that performs MBSFN transmission,
the number of base stations that do not contribute to MBSFN transmission, the number of areas (cells) served by a base station that does not contribute to MBSFN transmission, and a size of an area (cell) served by a base station that does not contribute to MBSFN transmission, each of which is system component information in an MBSFN area, and/or, at least one of the number of terminals that are receiving MBSFN transmission or information that makes it possible to estimate the number of said terminals, the number of terminals that want to receive MBSFN transmission or information that makes it possible to estimate the number of said terminals, a quality (error rate) of MBSFN transmission being executed or information that makes it possible to estimate the quality, and a ratio between the number of terminals that are receiving MBSFN transmission and the number of terminals that are receiving unicast transmission each of which is multicast related information, and/or, at least one of a unicast traffic volume (load), the number of terminals that are receiving unicast transmission, the number of terminals in an active state that may receive unicast transmission, and the number of terminals that are performing VoIP (Voice over Internet Protocol), each of which is unicast related information.

In the present invention, one or more of an outage of a predetermined index that is defined in advance, a coverage, a transmission rate, a received SIR (Signal-to-Interference Ratio), and a received SINR (Signal-to-Interference and Noise Power Ratio) is used as a requirement condition for an MBSFN quality.

For setting a target value of an MBSFN outage, there are two methods; in one method, the MBSFN transmission rate is kept (almost) constant and, in another method, the transmission rate is not considered (the condition for keeping the transmission rate constant is not set). For an MBSFN coverage, there are also two methods; that is, in one method the MBSFN coverage is kept (almost) constant and, in another method, the condition for keeping the MBSFN coverage constant is not set.

In the present invention, as the transmission parameter that configures the communication control information in an MBSFN area, at least one of a modulation scheme, a coding rate, an allocation, an allocation rate, or an allocation amount of a radio resource used for MBSFN transmission, a transmission power or a maximum of the transmission power, a reference signal composed of a known sequence, and a scrambling code may be output. More specifically, at least one of a modulation scheme, a coding rate, the number of MBSFN subframes, an MBSFN subframe position an MBSFN frame position an MBSFN frame period a transmission power or a maximum of the transmission power of a communication that is performed by a radio station, which does not contribute to MBSFN transmission, and that is performed at the same time MBSFN transmission is performed, a frequency usage rate of a communication that is performed by a radio station, which does not contribute to MBSFN transmission, and that is performed at the same time MBSFN transmission is performed, a frequency resource of a communication that is performed by a radio station, which does not contribute to MBSFN transmission, and that is performed at the same time MBSFN transmission is performed, a reference signal, and a scrambling code is output. A radio station that does not contribute to MBSFN in an MBSFN area performs one of unicast transmission and multicast transmission.

In the present invention, MBSFN transmission and unicast transmission are multiplexed in a time domain on a per frame basis, the frame being composed of N subframes (N is a predetermined positive integer) and a number of subframes is used as an allocation amount of a radio resource used for the MBSFN transmission. It is of course possible to apply the present invention to a method in which the transmission is multiplexed on a basis of multiple frames.

In the present invention, MBSFN transmission and unicast transmission may be multiplexed in a time domain on a per frame basis, the frame being composed of N subframes (N is a predetermined positive integer) and, in allocating a radio resource used for the MBSFN transmission, at least one of a subframe number used for MBSFN transmission, a start subframe number and the number of subframes to be used, a frame number used for MBSFN transmission or information indicating a frame number, and a frame period at which MBSFN transmission is performed may be used.

In the present invention, MBSFN transmission and unicast transmission may be multiplexed in the frequency domain and, as an allocation amount of a radio resource used for the MBSFN transmission, a total of continuous or discontinuous frequency bands (resources) may be used.

In the present invention, MBSFN transmission and unicast transmission may be multiplexed in the frequency domain and, as an allocation of a radio resource used for the MBSFN transmission, positions of continuous or discontinuous frequency bands (resources) may be used.

In the present invention, as transmission parameters for the unicast transmission that is performed at the same time MBSFN transmission is performed, at least one of a transmission power or a maximum of the transmission power, a frequency usage rate, and a frequency band (resource), may be used.

In the present invention, the transmission parameter for the MBSFN area is controlled so that a point-to-point (PTP) total system throughput of unicast transmission in the MBSFN applicable area is increased or maximized while satisfying the MBSFN requirement condition. That is, the criterion for determining the transmission parameters for the MBSFN area is that the PTP system throughput of the MBSFN area is increased or maximized while satisfying the MBSFN quality requirement.

Next, the present invention will be described below in detail with reference to the drawings. In the description below, an example based on 3GPP LTE (Long Term Evolution), one of the objects to which the present invention is applied, is used and, in the example, the MBSFN-related information is used as the communication status information and at least the transmission parameters are used as the communication control information. In 3GPP LTE, MBSFN and unicast are time-division multiplexed but not frequency-multiplexed. And, the information on the radio resources by which MBSFN (i.e. transmission parameter specified as communication control information) is performed is notified from a base station to a terminal as MSAP (MCH Subframe Allocation Pattern). MSAP includes micro-level information on a subframe basis and the macro-level information on a per frame basis. Therefore, the information on the number of MBSFN subframes and their positions and the information on the positions and the period of an MBSFN frame in the present embodiment are included in MSAP.

In LTE, the information that is controlled by the present invention is defined as follows.

For example, information on the subframes that may be used (reserved) for MBSFN is defined as "mbsfn-Subframe Configuration" (configuration of mbsfn-subframe), information on MBSFN frames (frame number, frame period, etc.) is defined as "radio Frame Allocation" (allocation of radio frame), and information on the number of MBSFN subframes is defined as "subframe Allocation" (sub-frame allocation).

One MBSFN area is composed, for example, of:

only the MBSFN service cells that perform MBSFN transmission or

MBSFN service cells that perform MBSFN transmission and reserved cells that perform unicast or single-cell/multicast transmission.

In the claims and the specification of the present application, a radio station (base station) that does not contributes to MBSFN transmission means a radio station (base station) that does not communicate via MBSFN regardless of whether or not the radio station (base station) support the MBSFN function. Therefore, in the embodiment described below, a base station that serves a reserved cell but does not contribute to MBSFN transmission may or may not have the MBSFN function in practice.

At the time MBSFN subframes are transmitted, a base station (eNodeB: called "eNB") in a reserved cell reduces the transmission power and performs unicast transmission, does not perform unicast transmission at all, or performs single-cell/multicast transmission for a terminal (User Equipment: called "UE") to reduce interference to the MBSFN service cells for improving the MBSFN quality. Although not limited thereto, it is assumed in the embodiments described below that the cell type (whether the cell is an MBSFN service cell or a reserved cell) was already notified from MCE to eNB, for example, when MBSFN was initialized. The cell type is notified again to eNB when the cell type is changed or at a periodic interval. The cell type may be notified either with the transmission parameters, which will be described later, or separately. In the description of the embodiment below, the description of the cell type notification processing is omitted.

FIG. 1 is a diagram showing components on a radio communication network side that performs MBSFN transmission in the present invention. In FIG. 1, eBMSC (enhanced Broadcast Multicast Service Centre) 101

(A) notifies an MCE (Multi-cell/multicast Coordination Entity) 103 about MBMS control information, such as a MBMS session control signal or MBMS traffic information, via an E-MBMS GW (gateway) 102, and (B) notifies a base station (eNB) 104 about MBMS data that will be transmitted to a terminal (UE) via MBSFN.

The MCE 103 allocates time and frequency radio resources to a base station (eNB), located in an MBSFN area, in which MBMS data is transmitted to multiple cells using MBSFN, and at the same time, determines the detail of the radio configuration such as a modulation and coding scheme. The MCE 103 performs an MBMS session control signaling processing but not a UE-MCE signaling processing. The MCE 103 is a logical entity. The MCE 103 may not be an independent apparatus and be a part of other network elements.

More specifically, the MCE 103

(A) generates MBSFN configuration information based on the MBMS control information, notified by the eBMSC 101 via the E-MBMS GW 102, and the MBSFN related information notified by the eNB 104, and notifies the eBMSC 101 about the generated information via the E-MBMS GW 102. The MCE 103 also (B) generates the MBSFN control information and notifies the eNB 104 about the generated information.

The MBSFN related information that the MCE 103 is notified by the eNB 104 includes the following.

(1) Information on the components of the MBSFN area such as:
Number of cells served by base stations that perform MBSFN;
Size (radius) of a cell served by a base station that performs MBSFN;
Number of cells served by base stations that perform unicast or single-cell/multicast; and
Size (radius) of a cell served by a base station that performs unicast or single-cell/multicast;

(2) Multicast related information on MBSFN area such as:
Number of UEs that are receiving MBSFN or information that makes it possible to estimate the number of the UEs;
Number of UEs that want to receive MBSFN or information that makes it possible to estimate the number of the UEs;
Quality (error rate) of MBSFN in execution or information that makes it possible to estimate the quality; and
Ratio of the number of UEs that are receiving MBSFN to the number of UEs that are receiving unicast;

(3) Unicast related information such as:
PTP traffic volume of unicast;
Number of UEs that are receiving unicast;
Number of UEs in an active state that may receive unicast; and
Number of UEs that are performing VoIP (Voice over Internet Protocol) service.

Note that (1)-(3) described above need not be notified always at the same time. For example, the information such as (1), which, once notified, remains unchanged for a long time or semi-permanently, is required to be notified again only when the information is changed.

The MBSFN configuration information generated by the MCE 103 includes the following:
Which eNB performs MBSFN; and
In which order the services are offered if there are multiple MBSFN service candidates.

The MBSFN control information notified from the MCE 103 to the eNB 104 includes the following:
MCS of MBSFN;
Number of MBSFN subframes;

Positions of MBSFN subframes;
Positions of MBSFN frames;
Period of MBSFN frame;
Reference signal of MBSFN;
Scrambling code of MBSFN;
Transmission power or maximum of transmission power in a reserved cell;
Frequency usage rate in a reserved cell; and
Frequency band (resource) in a reserved cell.

The E-MBMS GW (gateway) 102 transmits/reports an MBMS packet with the SYNC protocol (protocol for synchronizing data used for generating radio frames) to the eNB that performs MBSFN transmission. The MBMS GW 102 hosts the PDCP (Packet Data Convergence Protocol) layer in the user plane and transfers MBMS user data to the eNB via IP multicast. The MBMS GW 102 performs MBMS session control signaling (session start/stop) for an E-UTRAN (Evolved Universal Terrestrial Radio Access Network). Note that the E-MBMS GW 102, which is a logical entity, may be a part of another network element.

The M3 interface (between MCE and MBMS GW) is a control plane interface between E-UTRAN and EPC (Evolved Packet Core) and, on this interface, MBMS session control signaling is performed as an application on the EPS bearer level (radio configuration data is not transmitted). MBMS session control signaling includes signaling for starting/stopping an MBMS session. SCTP (Stream Control Transmission Protocol) is used as the signaling transfer protocol (PTP signaling).

The M2 interface (between MCE and eNB) is a control plane interface in E-UTRAN and, on this interface, the radio configuration data on a multi-cell transmission mode eNB and a single-cell transmission mode eNB that configures a reserved cell (if any) in an MBSFN area, and the session control signaling are transmitted as an application. SCTP (Stream Control Transmission Protocol) is used as the signaling transfer protocol (PTP signaling).

The M1 interface (between MBMS GW and eNB) is a user plane interface, and no control plane application is defined. IP multicast is used for the point-to-point transmission of user packets in the single-cell transmission and multi-cell transmission.

In the multi-cell transmission, the MCE 103 collects multicast related information and/or unicast related information from all eNBs, or a part of multiple eNBs, in the same MBSFN area.

The multicast related information includes the following:
Number of UEs that receive/request (want to receive) MBMS/MBSFN for each content; and
MBMS/MBSFN error rate.

The unicast related information includes, for example, the following:
Number of UEs in active state, that is, in RRC_CONNECTED state (state in which a radio link is established);
Number of UEs that are performing VoIP (Voice over IP); and
PTP traffic volume.

The multicast and unicast related information includes a ratio of the number of multicast-receiving UEs to the number of unicast-receiving UEs (or vice-versa).

It is also possible that the MCE 103 does not collect the ratio of the number of multicast-receiving UEs to the number of unicast-receiving UEs but that the MCE 103 collects the number of multicast-receiving UEs and the number of unicast-receiving UEs and calculates the ratio.

As described above, the MCE determines the transmission parameter for MBSFN transmission or unicast transmission in an MBSFN area. The MBSFN transmission parameter includes, for example, as follows:
Number of MBSFN subframes;
MSAP (Multicast channel Subframe Allocation Pattern) indicating micro/macro level allocation;
MCS; and
Transmission power or the maximum of transmission power of MBSFN transmission.

The unicast transmission parameter includes, for example, as follows:
Transmission power or the maximum of transmission power; and
Usable frequency band (resource)
in a MBSFN subframe in a reserved cell in an MBSFN area.

Figure 2:
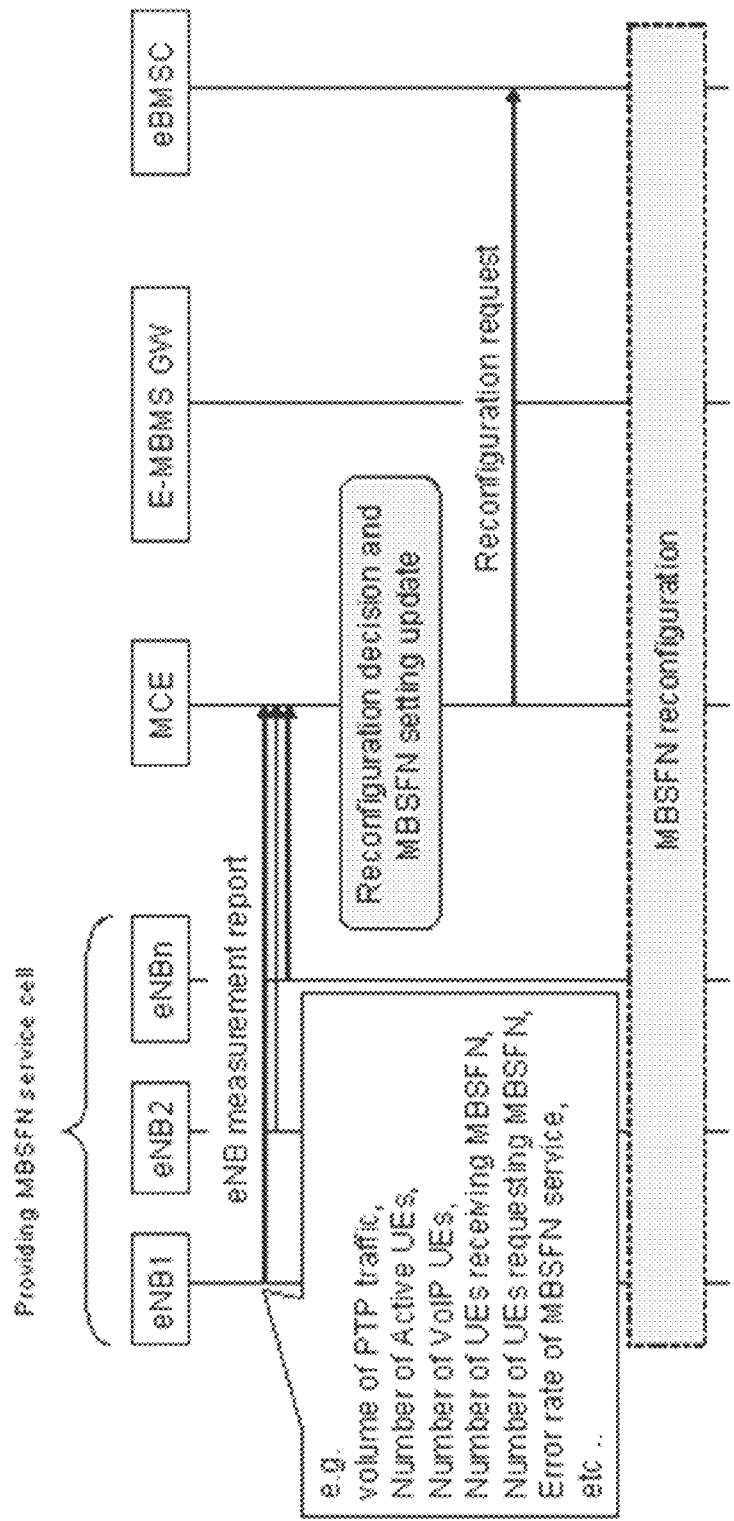
FIG. 2 is a diagram showing a first example of the sequence diagram in the present invention.

FIG. 2 is a sequence diagram showing a control procedure used in the embodiment shown in FIG. 1. Base stations eNB1-eNBn, each serving an MBSFN service cell, collect (measurement) information, defined in specifications in advance, or information requested by the MCE, and reports the measurement result to the MCE ("eNB Measurement Report" in FIG. 2).

Based on the measurement report (eNB Measurement Report) received from the base stations eNB1-eNBn, the MCE checks if the MBSFN (or MBSFN and unicast) transmission parameter in the MBSFN area needs to be reset ("Reconfiguration decision" in FIG. 2: decide to reset the parameter).

If it is determined by the MCE that the MBSFN transmission parameter needs to be reset, the MCE actually resets the MBSFN transmission parameter ("MBSFN setting update" in FIG. 2: update the MBSFN setting) and transmits a reconfiguration request to the eBMSC via the E-MBMS GW ("Reconfiguration Request" in FIG. 2: request for reset).

In response to the request for reconfiguration (Reconfiguration Request), the eBMSC reconfigures the transmission parameter using the same procedure as the MBSFN transmission parameter configuration procedure used when MBSFN is started ("MBSFN reconfiguration" in FIG. 2). Note that the parameter may be reconfigured not only by an absolute value but also by a relative value such as a difference or a rate.

As shown in FIG. 2, the information included in the eNB measurement report includes, for example, as follows.
Volume of PTP traffic in unicast transmission;
Number of active UEs performing unicast transmission;
Number of VoIP UEs;
Number of UEs receiving MBSFN;
Number of UEs requesting MBSFN; and
MBSFN quality (error rate, etc.) (Error rate of MBSFN service).

Of course, the information is not limited to those given above.

Figure 3:
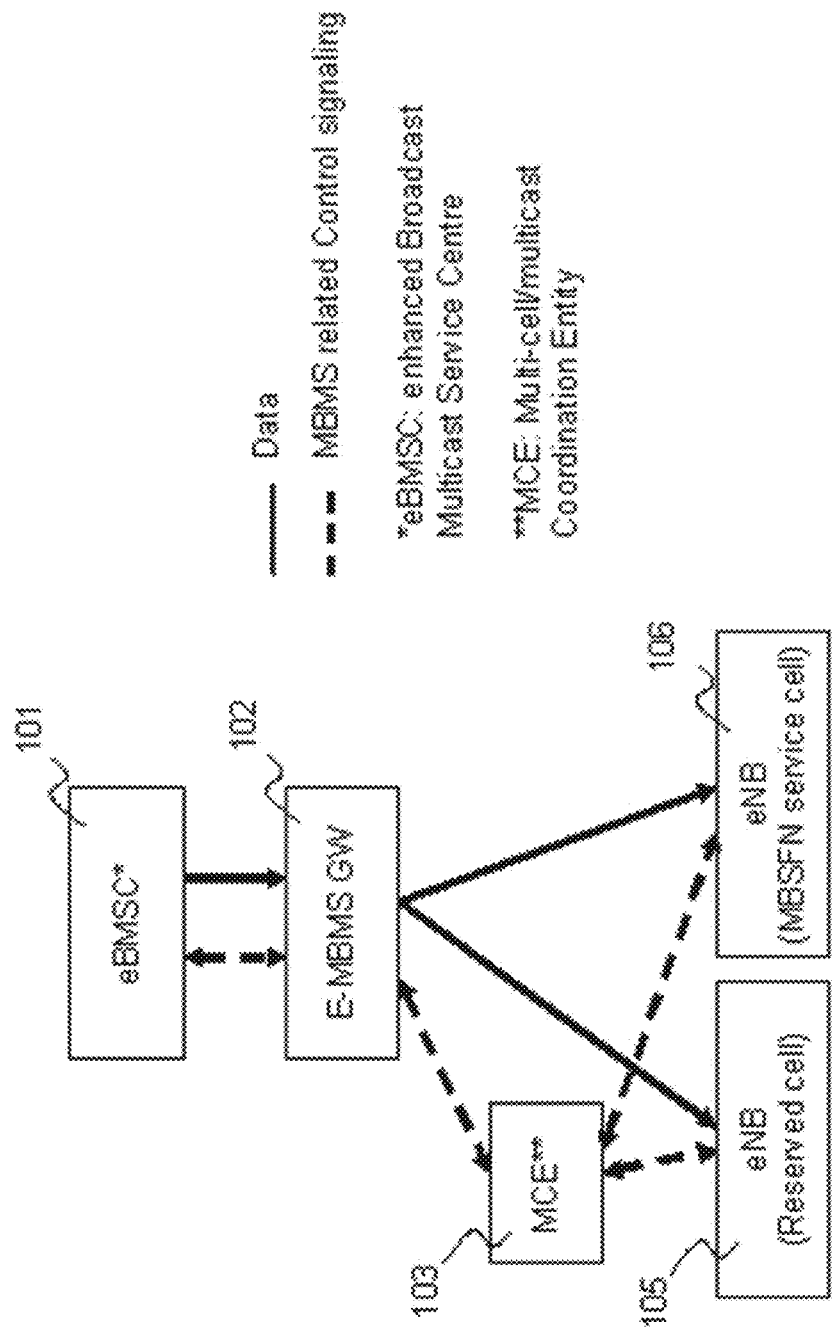
FIG. 3 is a diagram showing a second configuration example of a radio communication network apparatus in the present invention.
Figure 4:
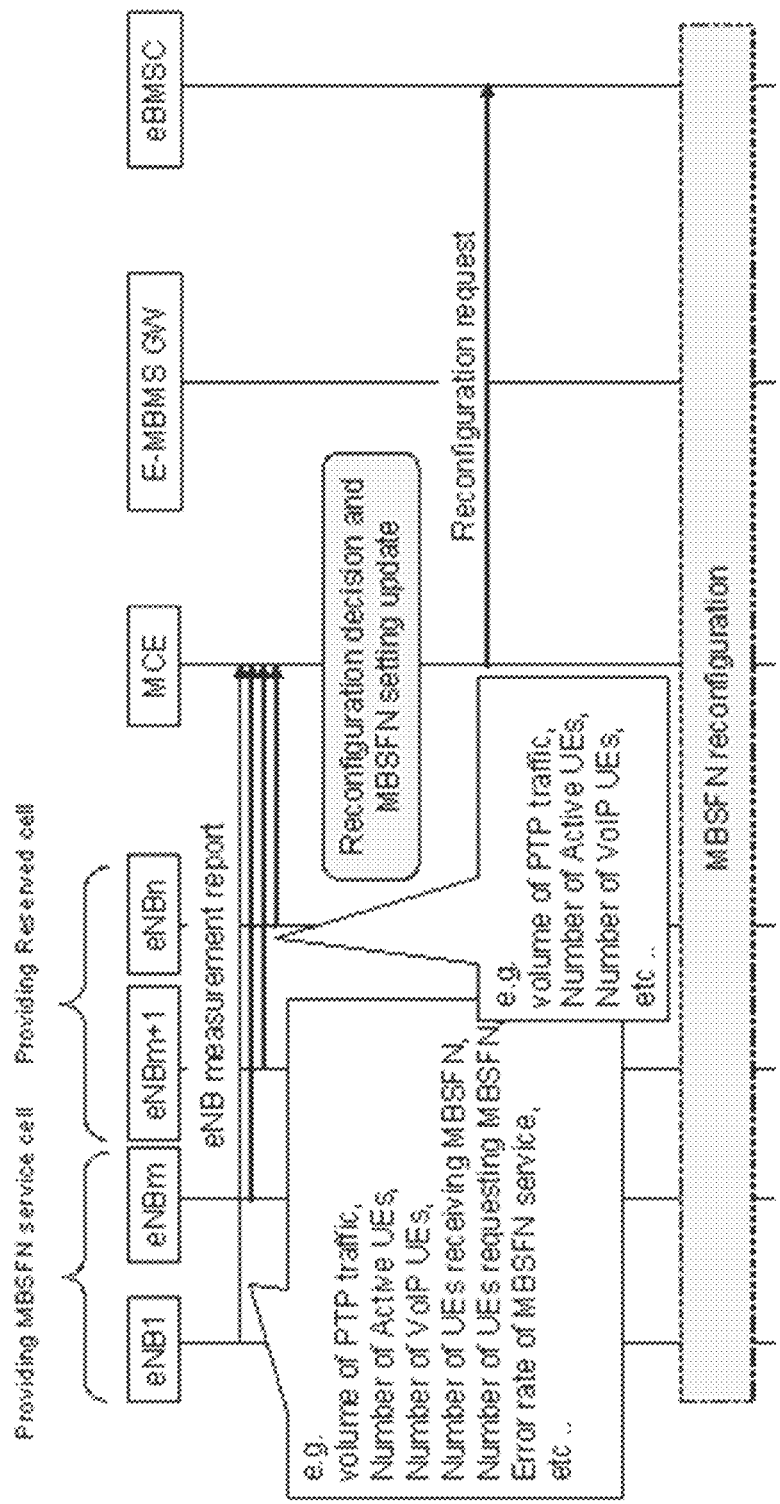
FIG. 4 is a diagram showing a second example of the sequence diagram in the present invention.

FIG. 3 is another diagram showing components on the radio communication network side that performs MBSFN transmission. The basic configuration is the same as that in FIG. 1, except that the eNBs are divided into two types: an eNB 105 that serves a reserved cell and an eNB 106 that serves an MBSFN service cell. FIG. 4 is a sequence diagram showing the control procedure used in the configuration shown in FIG. 3.

Base stations eNB1-eNBm each serving an MBSFN service cell and base stations eNBm+1-eNBn each serving a reserved cell collect (measurement) the information defined by specifications in advance or the information specified by MCE, and report the result to the MCE ("eNB Measurement Report" in FIG. 4).

Based on the eNB measurement report (eNB Measurement Report), the MCE checks if the MBSFN transmission parameter needs to be reset ("Reconfiguration decision" in FIG. 4).

If it is determined by the MCE that the MBSFN area transmission parameter must be reset, the MCE actually resets the MBSFN area transmission parameters and transmits a reconfiguration request to the eBMSC via the E-MBMS GW ("Reconfiguration Request" in FIG. 4*n*).

In response to the reconfiguration request (Reconfiguration Request), the eBMSC resets the parameters using the same procedure as the MBSFN transmission parameter configuration procedure used when MBSFN is started.

As shown in FIG. 4, an example of the information included in the eNB measurement report notified by eNB1-eNB*m*, each serving an MBSFN service cell, is as follows:
  Volume of PTP traffic in unicast transmission;
  Number of active UEs performing unicast transmission;
  Number of VoIP UEs;
  Number of UEs receiving MBSFN (or information that makes it possible to estimate the number of the UEs on the MCE side); and
  Number of UEs requesting MBSFN (or information that makes it possible to estimate the number of the UEs on the MCE side) error rate, etc.) (Error rate of MBSFN service).

On the other hand, the eNB Measurement Report information notified by eNB*m*+1-eNB*n* each serving a reserved cell includes, for example, as follows:
  Volume of PTP traffic in unicast transmission;
  Number of active UEs performing unicast transmission; and
  Number of VoIP UEs.

Of course, the information is not limited to those given above.

Figure 5:
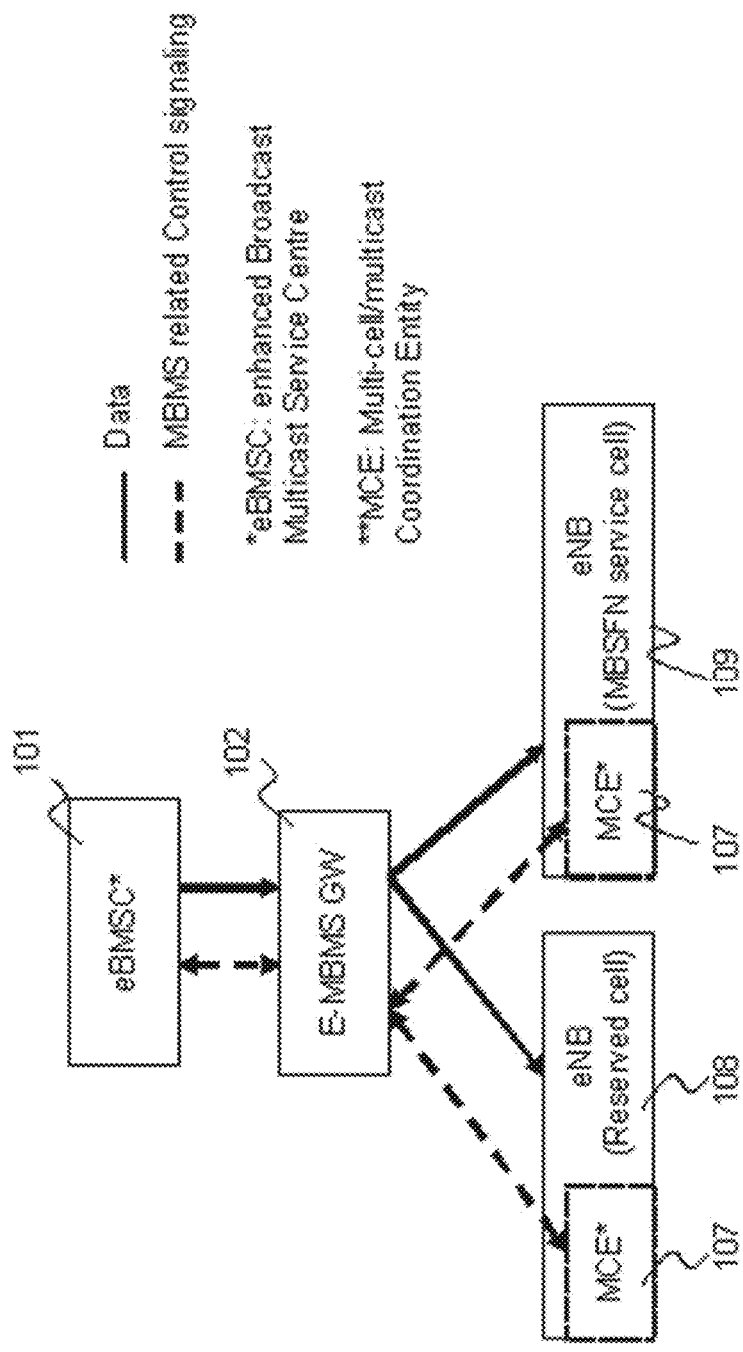
FIG. 5 is a diagram showing a third configuration example of a radio communication network apparatus in the present invention.

FIG. 5 is a diagram showing the configuration in which the MCE is one of the functional blocks of an eNB. As described above, the MCE, which is a logical entity, may be a part of other network equipment instead of being provided as a standalone equipment. In this example, the MCE is installed in the eNBs, that is, an MCE 107 is included in eNBs 108 and 109, one for each. In the configuration shown in FIG. 5, the function to exchange and control information between the MCEs installed in the eNBs is required in the E-MBMS GW. In FIG. 5, the eNB 108 is a base station that serves a reserved cell, and the eNB 109 is a base station that serves an MBSFN service cell.

Figure 6:
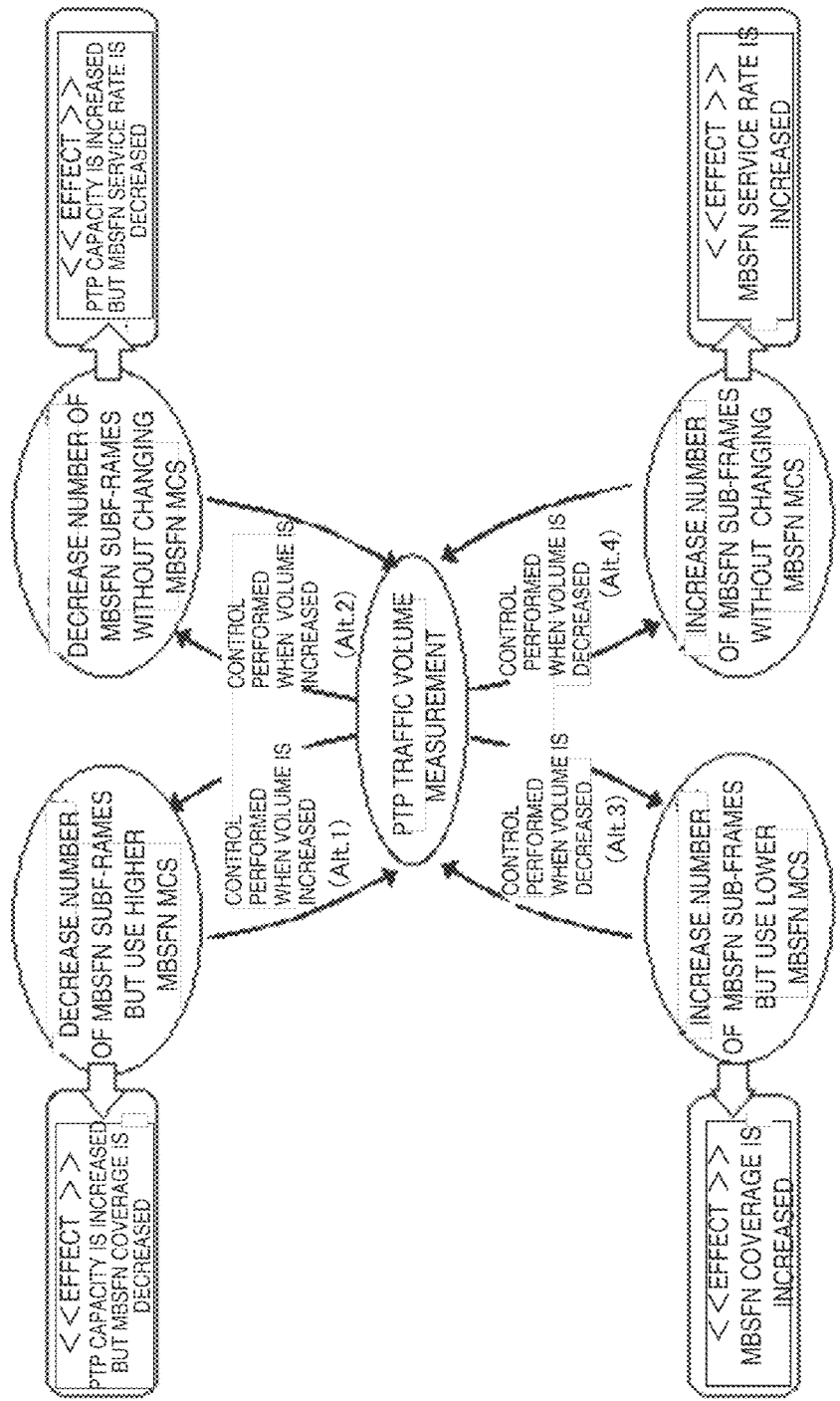
FIG. 6 is a diagram showing the concept of control in the present invention.
Figures 7A, 7B:
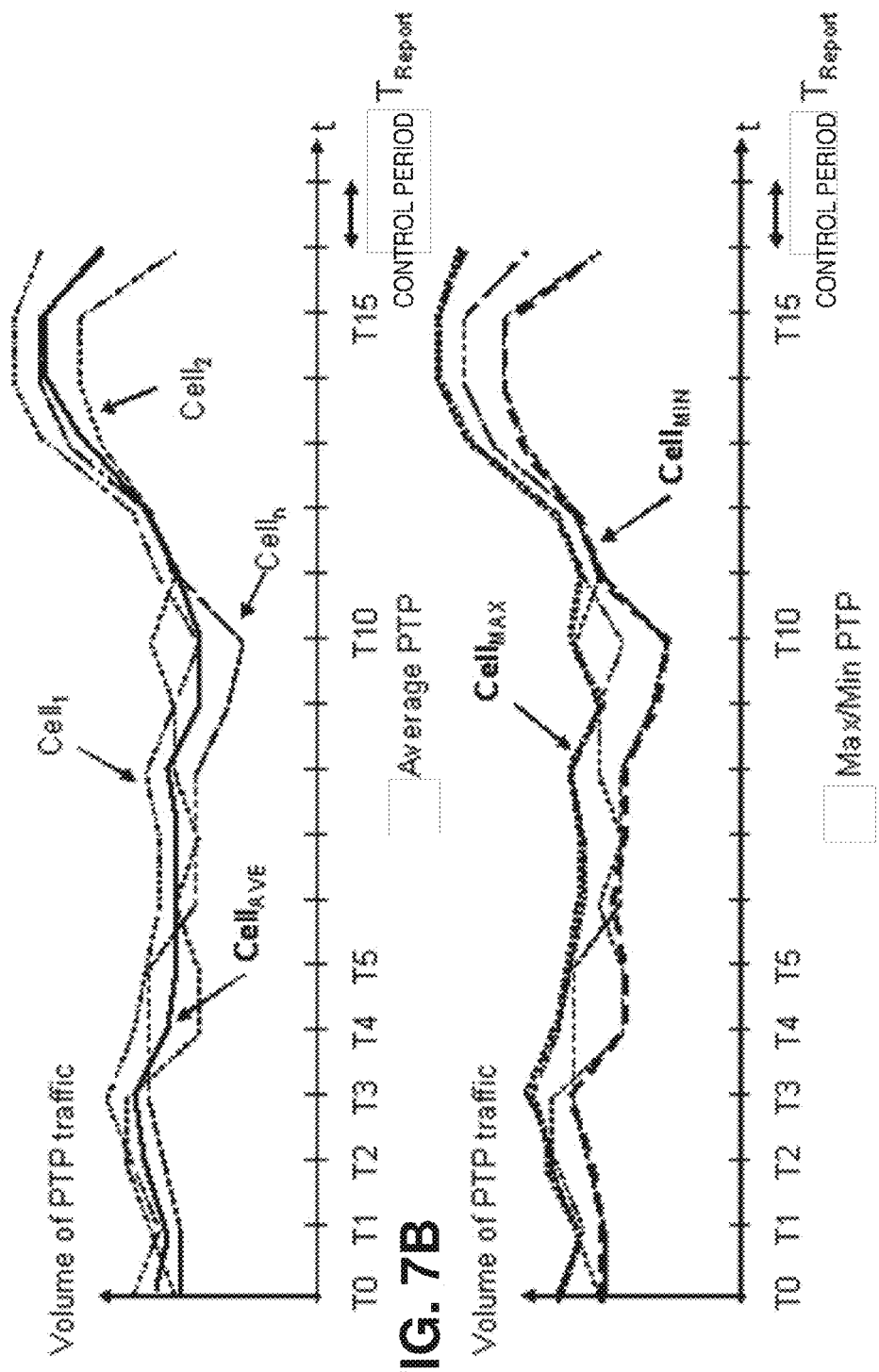
FIGS. 7A and 7B are diagrams showing PTP traffic volumes used in the present invention.

The operation will be described, based on the configuration of FIG. 3, assuming the 3GPP LTE technology. FIG. 6 and FIGS. 7A-7B are diagrams showing the basic concept of transmission parameter control in an MBSFN area in the present embodiment.

In the description below, it is assumed that the MBSFN area is composed only of MBSFN service cells (no reserved cell), and the transmission parameter that is controlled is as follows:
  Number of MBSFN subframes; and
  MBSFN MCS.

First, the PTP traffic volume is measured for each cell in the MBSFN area and, as shown in FIGS. 7A and 7B, the following is calculated as a representative value:
  Average value; or
  Maximum value (or minimum value).

Based on this representative value of the PTP traffic volume, a check is made if the PTP traffic volume is increased as compared with that at MBSFN transmission start time (or at the most recent control time) and, if so, the following processing is performed as shown in FIG. 6.

Alt. 1) Decrease the number of MBSFN subframes and use a higher MBSFN MCS, or

Alt. 2) Decrease the number of MBSFN subframes but do not change MBSFN MCS.

The purpose of Alt. 1 is to keep the MBSFN service rate constant. In this case, the PTP resource (PTP capacity) is increased but the MBSFN coverage is decreased.

On the other hand, the purpose of Alt. 2 is to keep the MBSFN coverage constant. The PTP resource (PTP capacity) is increased but the MBSFN service rate is decreased.

As described above, there is a tradeoff between the MBSFN service rate (service quality) and the MBSFN coverage, and which to select is decided according to which should have higher priority, MBSFN service rate or MBSFN coverage.

Conversely, if the PTP traffic volume is decreased as compared with that at MBSFN transmission start time (or at the most recent control time), the following processing is performed.

Alt. 3) Increase the number of MBSFN subframes and use a lower MBSFN MCS, or

Alt. 4) Increase the number of MBSFN subframes but do not change MBSFN MCS.

The purpose of Alt. 3 is to increase an MBSFN coverage while keeping the MBSFN service rate constant.

The purpose of Alt. 4 is to increase an MBSFN service rate while keeping the MBSFN coverage constant.

As described above, which to select, Alt. 3 or Alt. 4, is decided according to which should have higher priority, MBSFN service rate or MBSFN coverage.

Note that, as a combination of an increase or decrease in the PTP traffic volume as compared with that at MBSFN transmission start time (or at the most recent control time), it is possible to combine any one of Alt. 1 and Alt 2 in FIG. 6 with any one of Alt. 3 and Alt. 4.

FIG. 8 to FIG. 10E are diagrams showing the control based on the concept of this embodiment described with reference to FIG. 6. Assume that the MBSFN area is composed only of MBSFN service cells.

Figure 8:
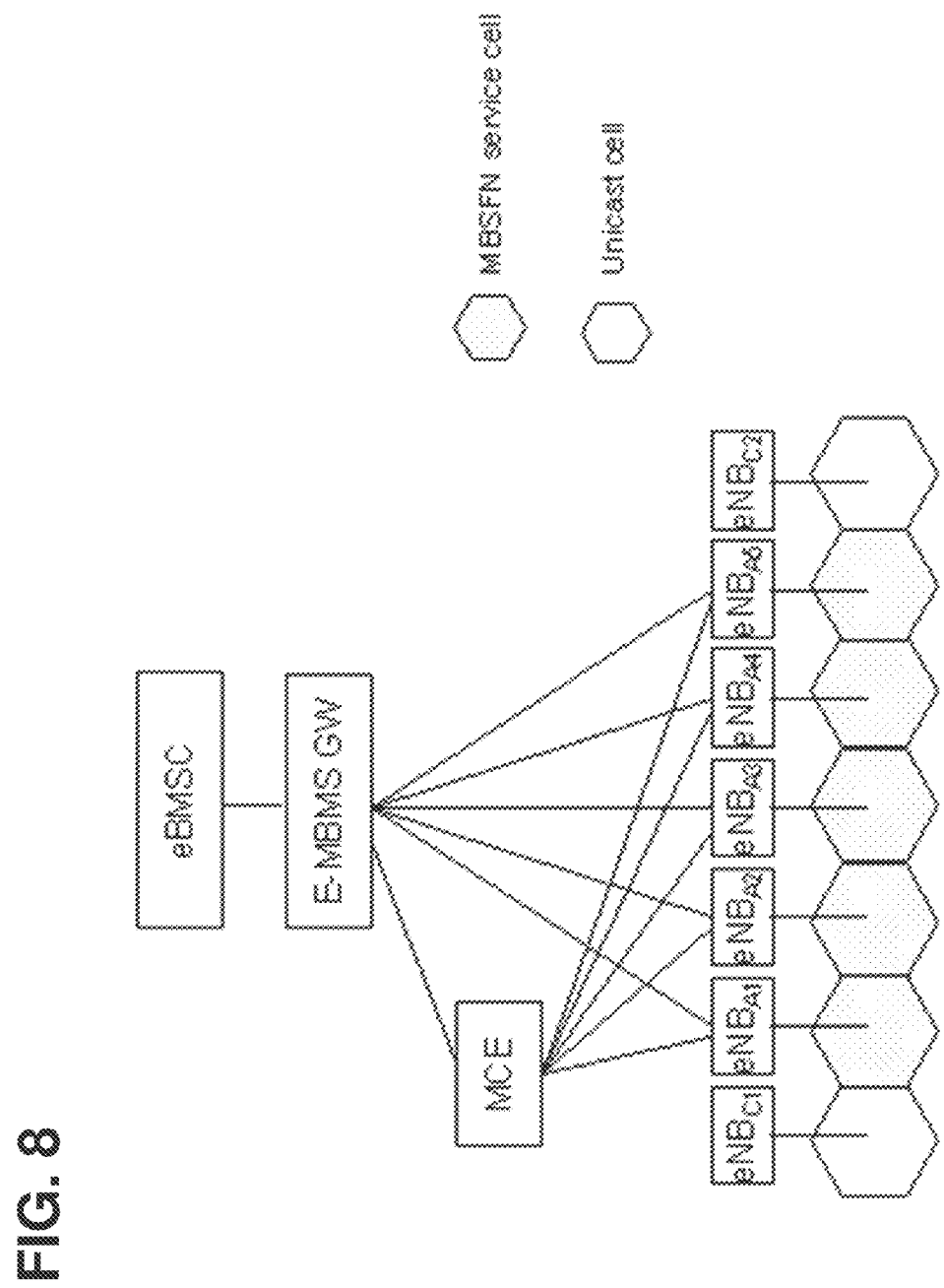
FIG. 8 is a diagram showing an example of the configuration of an MBSFN area in an embodiment of the present invention.
Figure 9:
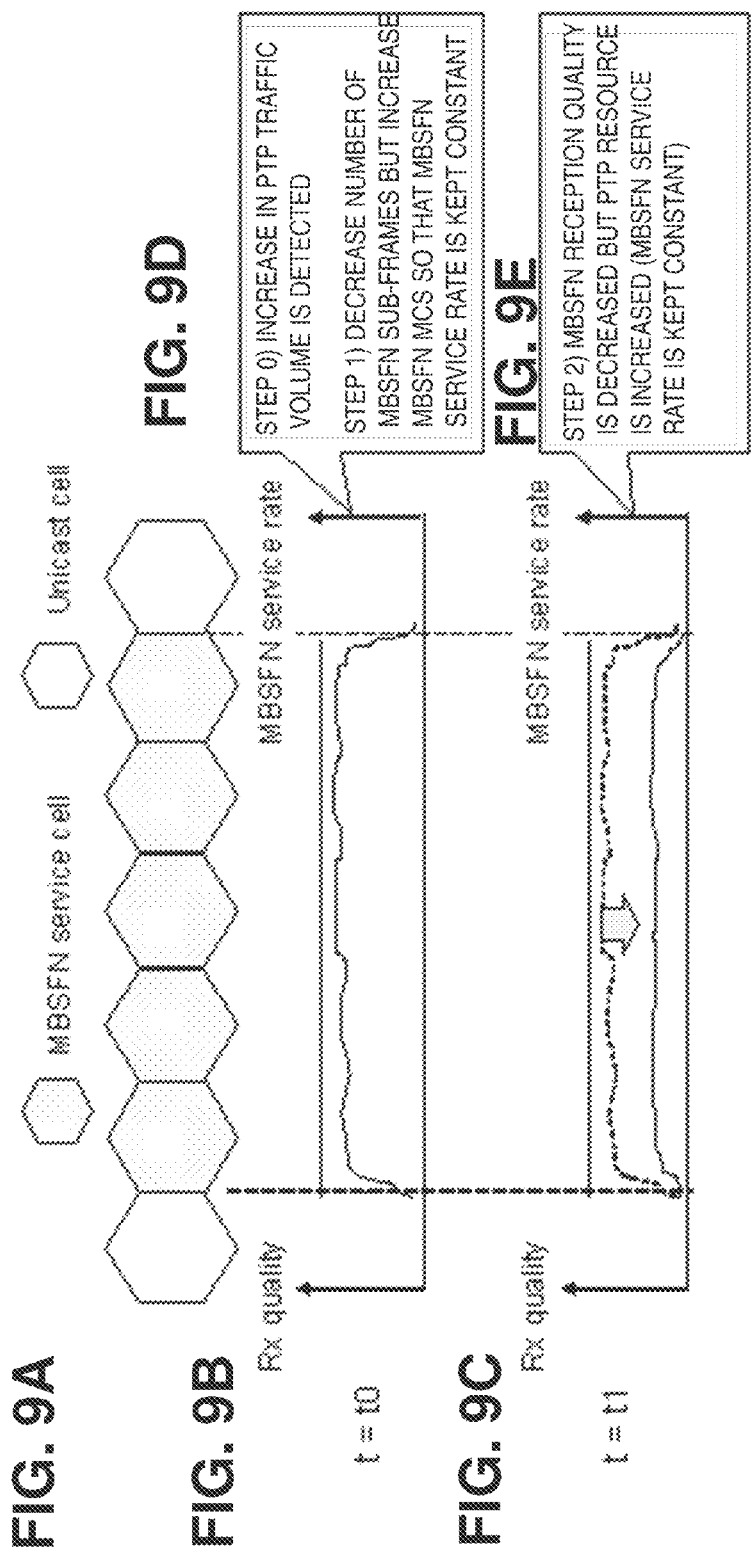
FIGS. 9A-9E are diagrams showing an example of transmission parameter control in an MBSFN area in the embodiment of the present invention.
Figure 10:
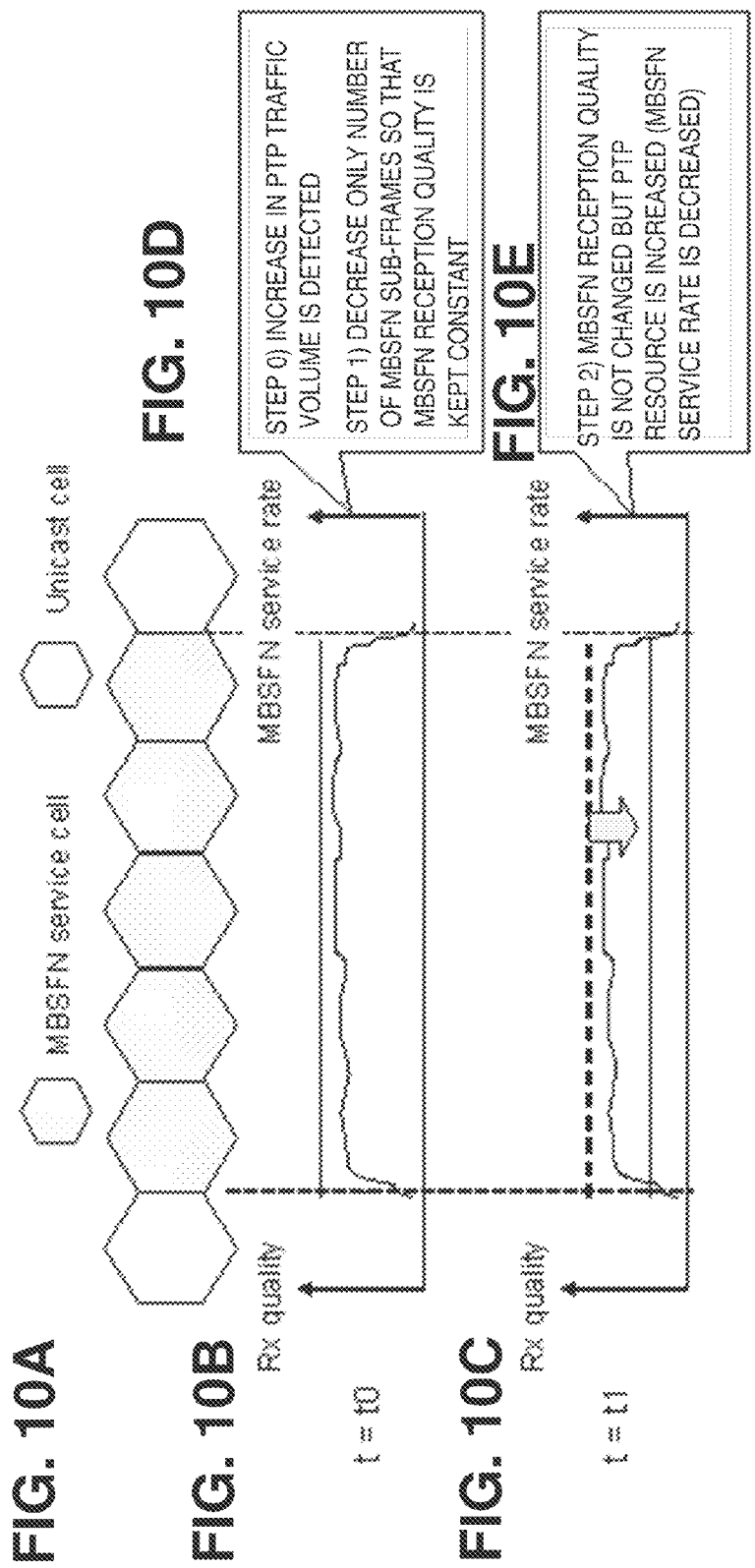
FIGS. 10A-10E are diagrams showing an example of transmission parameter control in an MBSFN area in the embodiment of the present invention.

Assuming that there is an MBSFN area composed of multiple MBSFN service cells and that unicast cells are adjacent to the MBSFN area, as shown in FIG. 8.

Figure 24:
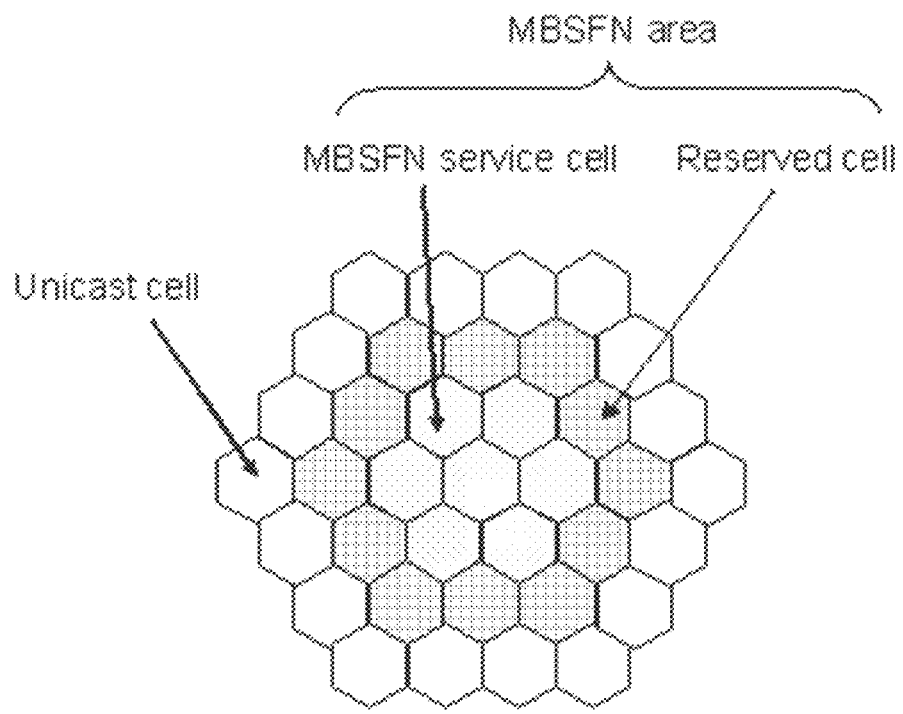
FIG. 24 is a diagram showing an example of cell arrangement of an MBSFN area used to describe a related technology.

In practice, the cells are a group of two-dimensionally arranged cells such as those shown in FIG. 24. FIG. 8 shows a part of the group (shown one-dimensionally). In the description below, it is assumed that the MBSFN area is fixed and composed of the following base stations.

eNBA1-A5 are base stations each of which serves an MBSFN service cell that belongs to the MBSFN area and performs MBSFN in MBSFN subframes; and eNBC1 and eNBC2 are base stations each of which does not belong to the MBSFN area and performs only unicast.

In this case, eNBA1-A5 exchange information with the MCE and receive MBMS data from the eBMSC via E-MBMS GW and transmit the received data to the terminals (UE).

On the other hand, the operation of eNBC1 and eNBC2 is independent of the base stations in the MBSFN area where the present invention is used and, therefore, the description is omitted here.

As shown in FIGS. 9A-9E, it has been assumed that an increase in the PTP traffic volume is detected at time t=t0.

FIGS. 9B and 9C show the MBSFN service rate (MBSFN service rate) and the reception quality (Rx quality) in the cells shown in FIG. 8 at time t0 and t1.

In this case, Alt. 1 in FIG. 6 is used to decrease the number of MBSFN subframes and increase the MBSFN MCS so that the MBSFN service rate is kept constant.

This indicates that, at time t=t1, the MBSFN service rate is kept unchanged but the MBSFN reception quality is decreased (see the down arrow in FIG. 9C). Note that the PTP resource is increased.

On the other hand, Alt. 2 in FIG. 6 is used in FIGS. 10A-10E to decrease only the number of MBSFN subframes for keeping the reception quality constant so that the MBSFN coverage is kept unchanged. FIGS. 10B and 10C show the MBSFN service rate (MBSFN service rate) and the reception quality (Rx quality) of the cells in FIG. 8 at time t=t0 and t1.

This indicates that, at time t=t1, the MBSFN reception quality is kept unchanged but the MBSFN service rate is decreased (see the down arrow indicating the MBSFN service rate in FIG. 9C).

FIG. 11 and FIGS. 12A-12I are diagrams showing the control based on the concept of the present embodiment described with reference to FIG. 6. In those figures, it is assumed that the MBSFN area is composed of MBSFN service cells and reserved cells. FIG. 12B to FIG. 12E show the reception quality (Rx quality) of the cells shown in FIG. 11 at times t=t0-t3. FIG. 12F-FIG. 12I show the control performed by the MCE at times t=t0-t3 in FIG. 12B-FIG. 12E.

Figure 11:
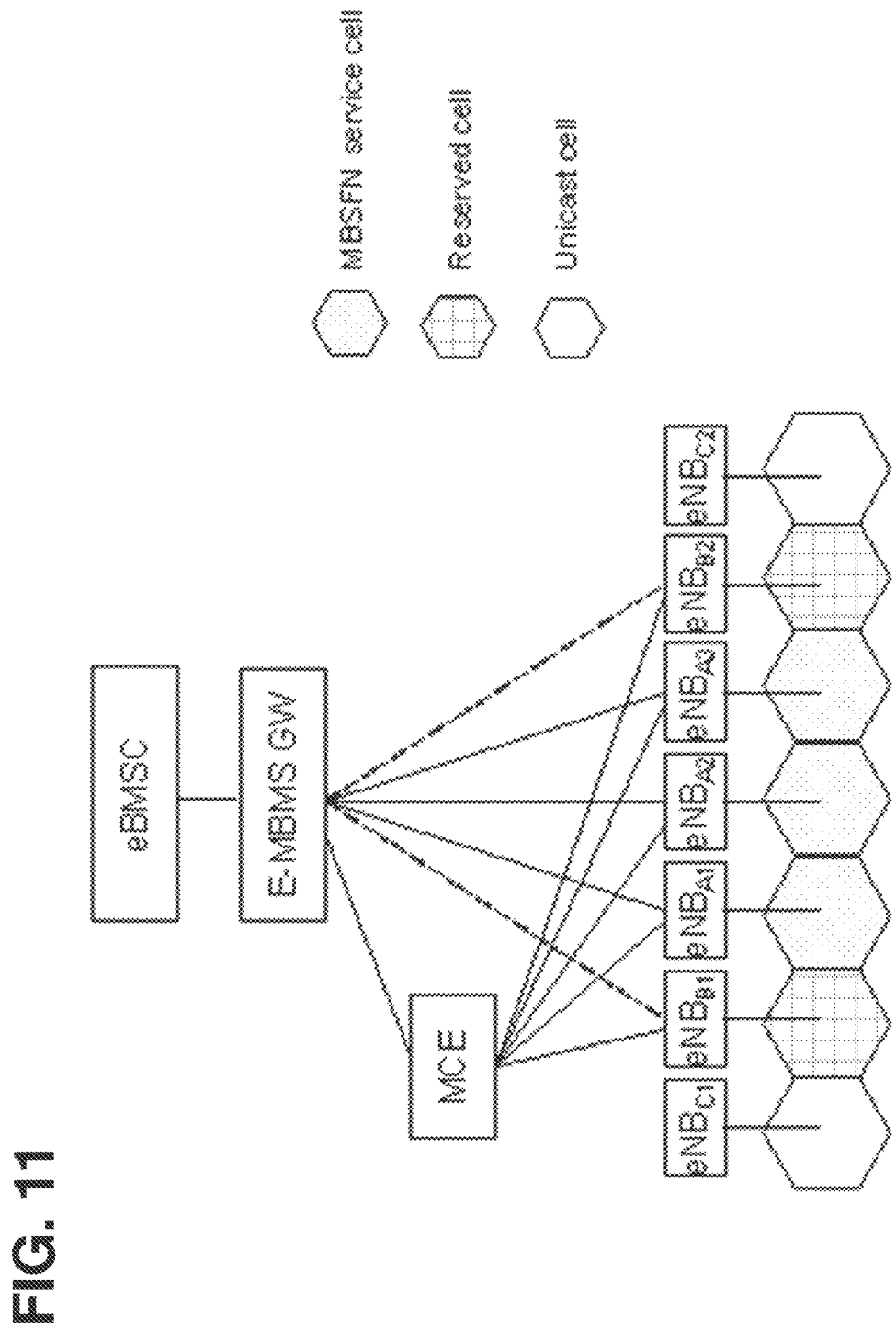
FIG. 11 is a diagram showing an example of the configuration of an MBSFN area in first and second exemplary embodiments of the present invention.

As shown in FIG. 11, it is assumed that there is an MBSFN area composed of MBSFN service cells and reserved cells and that there are neighboring unicast cells.

Also it is assumed that the MBSFN area is fixed as follows:
eNBA1-A3 and eNBB1 and B2 are base stations that belong to the MBSFN area; and
eNBC1 and C2 are base stations that do not belong to the MBSFN area and that perform only unicast transmission.

Among base stations that belong to the MBSFN, eNBA1-A3 are base station that serves the MBSFN service cells, and
eNBB1 and B2 are base stations that serve reserved cells.

In this case, eNBA1-A3 and eNBB1 and B2 exchange information with the MCE, and eNBA1-A3 receive MBMS data from the E-MBMS GW and transmits the received data to terminals (UE) not shown.

On the other hand, the operation of the base stations eNBC1 and eNBC2, which do not belong to the MBSFN area and which perform only unicast transmission, is independent of the base stations in the MBSFN area where the present invention is used and, therefore, the description is omitted here.

As the transmission parameter control method in the MBSFN area, Alt. 1 in FIG. 6 is used in which the MBSFN service rate is kept constant.

First, in FIG. 12B, it is assumed that an increase in the PTP traffic volume in the reserved cells is detected at time t=t0 (step 0 in FIG. 12F).

Therefore, the number of MBSFN subframes is decreased and a higher MBSFN MCS is used to keep the MBSFN rate constant (step 1).

Then, the MBSFN reception quality (Rx quality) is deteriorated at time t=t1 as shown in FIG. 12C (step 2 in FIG. 12G).

To address this problem, the transmission power in the reserved cells is decreased at time t=t2 (FIG. 12D) to try to improve the MBSFN reception quality (step 3 in FIG. 12H).

As a result, at time t=t3 (FIG. 12E), the reserved cell reception quality is deteriorated but, instead, the MBSFN reception quality is improved (step 4 in FIG. 12I).

As described above, arranging the reserved cells on the periphery of the MBSFN service cells and decreasing the transmission power in the reserved cells could prevent the MBSFN reception quality from being significantly deteriorated while keeping the MBSFN service rate.

With the configuration, shown in FIG. 11, as the basic configuration, embodiments will be described below in detail. A method is used in which an outage target value is satisfied while keeping the MBSFN service rate (almost) constant in order to satisfy the MBSFN quality requirement.

First Exemplary Embodiment

In a first exemplary embodiment of the present invention, based on
PTP traffic volume (load) of reserved cells and
Target value of MBSFN outage probability,
the following are set so that the total system throughput of the MBSFN area is maximized:
Number of MBSFN subframes;
MBSFN MCS; and
Transmission power or maximum of transmission power for MBSFN subframes in a reserved cell.

An example of an MBSFN outage probability is what percent of UEs do satisfy a required error rate (for example, 10-percent PER (Packet Error Rate) or BLER (Block Error Rate)). An example of the target is that the outage probability is required to be 5%, that is, UEs satisfying the required error rate is required to be 95% or higher.

In the present embodiment, MBSFN subframes are assumed to be included in each frame.

To implement the present embodiment, there is provided in advance a table showing the relation among the following items:
MBSFN outage probability(%);
MBSFN MCS; and
Transmission power or the maximum transmission power in a reserved cell The values shown in this table largely depend on the number of MBSFN subframes or on a cell radius of an MBSFN area. Therefore, an evaluation result obtained in advance by computer simulation or by statistical data obtained on actual apparatuses is used.

As shown in expression (1) shown below, a sum of the system throughput of the MBSFN service cells and that of the reserved cells is calculated to calculate a system throughput of the MBSFN area.

$$\text{System\_throughput} = \sum^{S} \text{Min}(\text{generated\_traffic}, \text{acceptable\_traffic}) \ldots \text{MBSFN Service cell} + \sum^{R} \text{Min}(\text{generated\_traffic}, \text{acceptable\_traffic}) \ldots \text{Reserved cell} \quad (1)$$

where
S is the number of MBSFN service cells in the MBSFN area of interest and
R is the number of reserved cells in the MBSFN area of interest.

"Acceptable traffic" is a function of the number of MBSFN subframes, MCS, and the transmission power or the maximum of the transmission power in the reserved cells. If MBSFN subframes are not always included in every frame, the MBSFN frame period is also one of the variables.

The number of MBSFN subframes, MCS, and the transmission power or the maximum of the transmission power in the reserved cells, which maximize the total system throughput of this MBSFN area, are set.

FIG. 13 is a diagram showing the configuration of the base stations (eNB) in the first exemplary embodiment. In this figure, an eNB 201 is assumed to perform MBSFN transmission. Referring to FIG. 13, this base station (eNB) 201 comprises an MBSFN control unit 202, an MBSFN signal transmission unit 203, a unicast signal control unit 204, a unicast signal transmission unit 205, a unicast signal reception unit 206, a unicast signal demodulation unit 207, and an MBSFN related information generation unit 208.

The MBSFN control unit 202 receives MBSFN control information from the MCE, and outputs MBSFN transmission control information to the MBSFN signal transmission unit 203 and MBSFN subframe information to the unicast signal control unit 204 respectively.

The MBSFN signal transmission unit 203 generates an MBSFN signal based on the MBSFN data and the MBSFN transmission control information, and transmits the generated MBSFN signal to a terminal (UE) not shown.

The unicast signal control unit 204 outputs a unicast transmission control information to the unicast signal transmission unit 205, and unicast transmission information to the MBSFN related information generation unit 208, based on DL (Downlink) unicast information and MBSFN subframe information.

The unicast signal transmission unit 205 generates a DL unicast signal based on the DL unicast information and unicast transmission control information, and transmits the generated DL unicast signal to a UE.

On the other hand, the unicast signal reception unit 206 receives a UL (Uplink) unicast signal and outputs the received UL unicast signal to the unicast signal demodulation unit 207.

The unicast signal demodulation unit 207 demodulates the received unicast signal, transmits UL unicast information to the MME/S-GW (Mobility Management Entity/Serving Gateway), and outputs MBSFN feedback information to the MBSFN related information generation unit 208.

The MBSFN related information generation unit 208 generates MBSFN related information based on the unicast transmission information and the MBSFN feedback information, and transmits the generated MBSFN related information to the MCE. The function/processing of the MBSFN control unit 202, MBSFN signal transmission unit 203, unicast signal control unit 204, unicast signal transmission unit 205, unicast signal reception unit 206, unicast signal demodulation unit 207, and MBSFN related information generation unit 208 in this base station may be implemented by a programs executed on a computer configuring the base station.

Figure 14B:
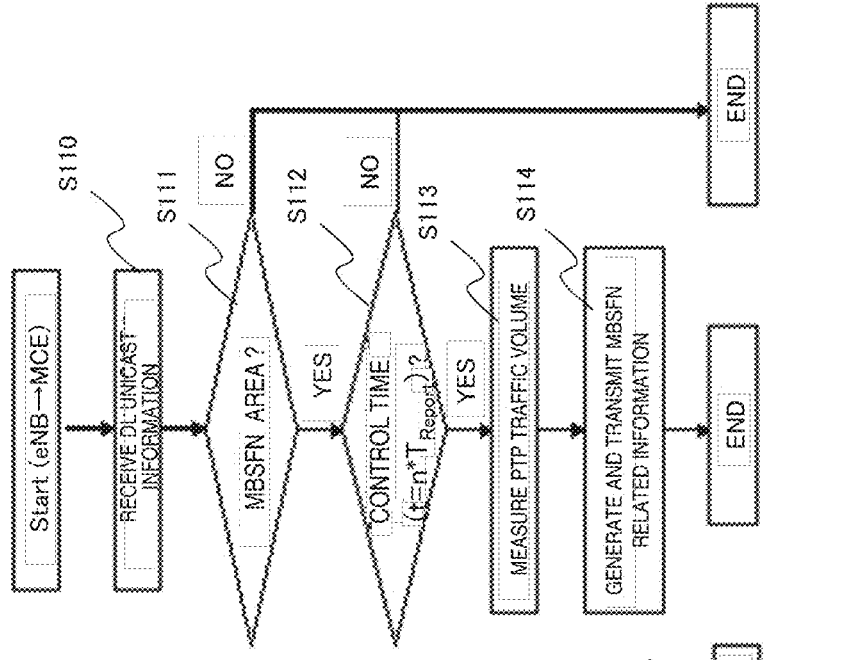
FIGS. 14A and 14B are flowcharts showing the processing of the base station in the first exemplary embodiment of the present invention.
Figure 14A:
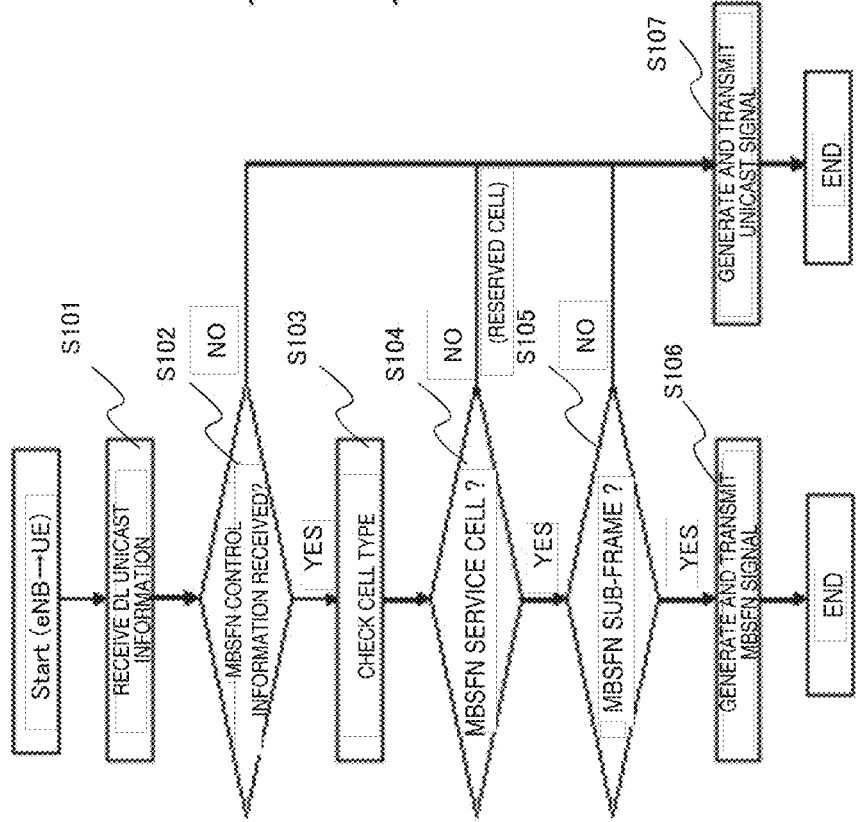

FIGS. 14A and 14B are flowcharts showing processing performed in the base station shown in FIG. 13. FIG. 14A shows the flow of transmission from the base station to a UE.

The unicast signal control unit 204 of the base station is assumed to receive the DL unicast information from the MME/S-GW.

First, the MBSFN control unit 202 of the base station (eNB) checks if the MBSFN control information has been received from the MCE, that is, if the base station belongs to an MBSFN area (S102). If the base station does not belong to an MBSFN area (No in S102), the usual unicast transmission is assumed and the unicast signal transmission unit 205 performs only the unicast transmission (S107).

If the MBSFN control information is received from the MCE (Yes in S102), the MBSFN control unit 202 checks if the type of the cell that the MBSFN control unit 202 serves is an MBSFN service cell or a reserved cell (S103).

If the MBSFN control unit 202 recognizes that the cell is a reserved cell as a result of the cell type checking in step S103 (No in S104), the base station (eNB) performs only the unicast transmission through the unicast signal transmission unit 205 (S107).

If the MBSFN control unit 202, recognizes that the cell is an MBSFN service cell as a result of the cell type checking in step S103 (Yes in S104) and if the subframe is an MBSFN subframe (Yes in S105), the MBSFN signal transmission unit 203 transmits the MBSFN signal (S106). For non-MBSFN subframes, the unicast signal transmission unit 205 performs the unicast transmission (S107).

On the other hand, FIG. 14B shows a flow of transmission from a base station to the MCE.

The unicast signal control unit 204 of the base station (eNB) receives the DL unicast information from the MME/S-GW (S110).

The MBSFN control unit 202 of the base station (eNB) checks if the base station (eNB) belongs to an MBSFN area (S111). If the base station (eNB) does not belong to an MBSFN area (No in S111), the unicast signal transmission unit 205 performs only the usual unicast transmission.

If the base station (eNB) belongs to an MBSFN area, the MBSFN control unit 202 of the base station (eNB) checks if the time matches the timing for notifying the MCE about the MBSFN information (time t=n*TReport), that is, checks if a control time has arrived (S112).

If the control time has arrived (Yes in S112), the MBSFN related information generation unit 208 measures the PTP traffic volume for each cell (S113), generates MBSFN related information that includes a PTP traffic volume, and transmits the generated MBSFN related information to the MCE (S114).

The MCE determines a MBSFN area transmission parameter based on the MBSFN related information.

Figure 15:
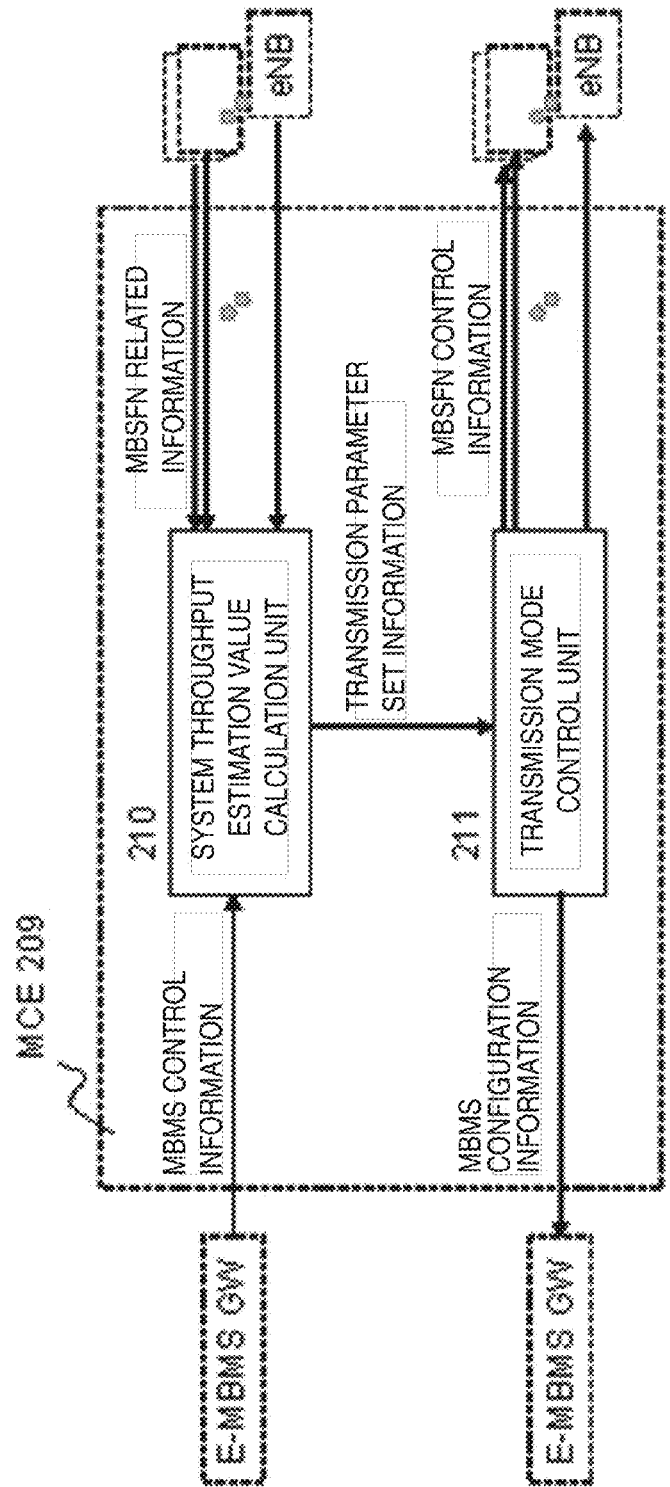
FIG. 15 is a block diagram showing an MCE in the first exemplary embodiment of the present invention.

FIG. 15 is a block diagram showing the configuration of the MCE in the first exemplary embodiment. It is assumed that an MCE 209 is connected to one E-MBMS GW and multiple eNBs. Referring to FIG. 15, the MCE 209 comprises a system throughput estimation value calculation unit 210 and a transmission mode control unit 211.

The system throughput estimation value calculation unit 210 calculates a system throughput estimation value, as shown in expression (1) given above, based on the MBMS control information received from the E-MBMS GW and the MBSFN related information received from the multiple eNBs, and outputs the system throughput and its parameters to the transmission mode control unit 211 as the transmission parameter set information.

The transmission mode control unit 211 determines the MBSFN and unicast transmission modes, based on the table (not shown) indicating the relation among:

Transmission parameter set information;
MBSFN outage probability (%);
MBSFN MCS; and
Transmission power or the maximum of the transmission power in the reserved cells.

Then, the transmission mode control unit 211 sends the MBMS configuration information to the E-MBMS GW, and the MBSFN control information to the eNBs, respectively. Note that the function/processing of the system throughput estimation value calculation unit 210 and the transmission mode control unit 211 may be implemented by the program executed on the computer configuring the MCE 209.

Figure 16:
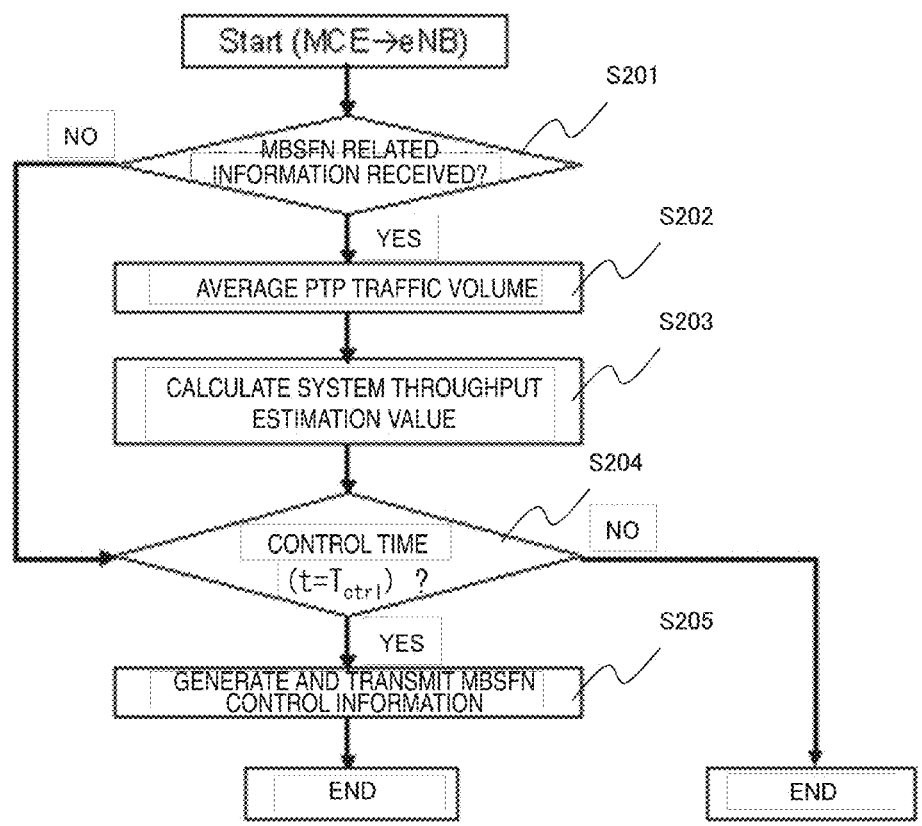
FIG. 16 is a flowchart showing the processing of the MCE in the first exemplary embodiment of the present invention.

FIG. 16 is a flowchart showing the processing of the MCE shown in FIG. 15.

The system throughput estimation value calculation unit 210 of the MCE notifies the base stations about a default setting of the MBSFN area transmission parameter and then waits for the MBSFN related information, which includes a PTP traffic volume, to be reported from the base stations.

If a control time, that is, an update time of the MBSFN area transmission parameter, has arrived (Yes in S204) before the MBSFN related information is reported, the transmission mode control unit 211 of the MCE notifies the base stations about the default setting (or the most recent setting) that has not been updated (S205).

If the MBSFN related information is reported from the base station (Yes in S201), the system throughput estimation value calculation unit 210 of the MCE calculates a time average of PTP traffic volume by performing a simple moving averaging or a weighted moving averaging, based on the PTP traffic volume information included in the MBSFN related information, and a previously reported PTP traffic volume (S202).

The system throughput estimation value calculation unit 210 of the MCE calculates a system throughput, based on the time average of the PTP traffic volume, with the MBSFN area transmission parameters as a variable (S203), and determines a combination of transmission parameters that maximize the total of the system throughputs of the MBSFN area.

The transmission mode control unit 211 of the MCE checks if the control time has arrived (S204) and, if the control time has arrived (Yes in S204), notifies the base station about the determined transmission parameter of the MBSFN area (S205).

The following describes the procedure for determining the MBSFN and unicast transmission parameters in the first exemplary embodiment.

In the description below, it is assumed that eNBA1-A3 and eNBB1-B2 belong to the same MBSFN area and exchange information with the MCE and that eNBA1-A3 perform both unicast transmission and MBSFN transmission and eNBB1-B2 perform only unicast transmission.

The MCE has a table, such as the one shown in FIG. 17, that is created by calculating the relation among the MBSFN outage probability (%), MCS, and transmission power, or maximum of transmission power, in the reserved cells. This table is stored in a memory, not shown, (for example, rewritable, non-volatile memory) in the system throughput estimation value calculation unit 210 of the MCE in FIG. 15.

Each eNB in the MBSFN area measures the PTP traffic volume for each cell at a periodic interval of TReport (=T) and notifies the MCE about the measured volume.

The system throughput estimation value calculation unit 210 of the MCE calculates the average of each of the following:

reported values of the PTP traffic volume from the eNBs each serving an MBSFN service cell; and reported values of the PTP traffic volume from the eNBs each serving a reserved service cell.

After that, based on the calculated averages of the PTP traffic volumes, the transmission mode control unit 211 of the MCE determines the following at a periodic interval of Tctrl (for example, Tctrl=5*TReport=5T).

Number of MBSFN subframes, and MCS of MBSFN; and

Transmission power or the maximum transmission power used for MBSFN subframes in a reserved cell.

If the control period (Tctrl) of the MCE is longer than the period of report (TReport) from an eNB as in the present embodiment, one of the following two methods is used:

Simple moving average in which the report values received from the eNBs at each time are simply time-averaged; and Weighted moving average in which the report values received from the eNBs at each time are weighted.

In the description below, these two methods are simply called as a time average with no distinction between them.

At a specified point of time t, the system throughput estimation value calculation unit 210 of the MCE first creates a table, such as the one shown in FIG. 18, indicating the relation among MBSFN outage probability(%);

MCS and number of MBSFN subframes; and

Transmission power or the maximum transmission power used in a reserved cell, based on the MBMS transmission rate (or service type information that makes it possible to estimate the MBMS transmission rate) included in the MBMS control information notified by the E-MBMS GW and on the table shown in FIG. 17.

Now, it is assumed that the target value of the MBSFN outage probability is 10%. In this case, in FIG. 18, the candidates for a combination of the transmission power or the maximum of the transmission power for the MBSFN subframes in a reserved cell, MBSFN MCS, and the number of MBSFN subframes, which satisfy the outage probability=10%, are the following three.

([Reserved cell power], [MBSFN MCS]/[# of subframes])=(50%, 1/8), (10%, 2/7), (0%, 10/1)

Based on the time-average value of the PTP traffic for the periods 5T, t=T0 to t=T4, because the control period of the MCE is 5 T, the system throughput is calculated for each of the combinations of the above three using expression (1) and the combination is selected that achieves the maximum throughput.

Now, it is assumed that the system throughput of each of the combinations described above is 180 Mbps, 220 Mbps, and 340 Mbps, respectively. In this case, the transmission mode control unit 211 of the MCE determines the transmission parameters as follows:

Transmission power in MBSFN subframes in a reserved cell is 0% of the maximum transmission power (that is, in a reserved cell, the MBSFN subframes are not used for unicast transmission), MBSFN MCS is 10, and Number of MBSFN subframes is 1.

The transmission mode control unit 211 of the MCE notifies each eNB about the determined transmission parameters, and in accordance with this notification, the eNB performs MBSFN or unicast transmission.

Figure 19:
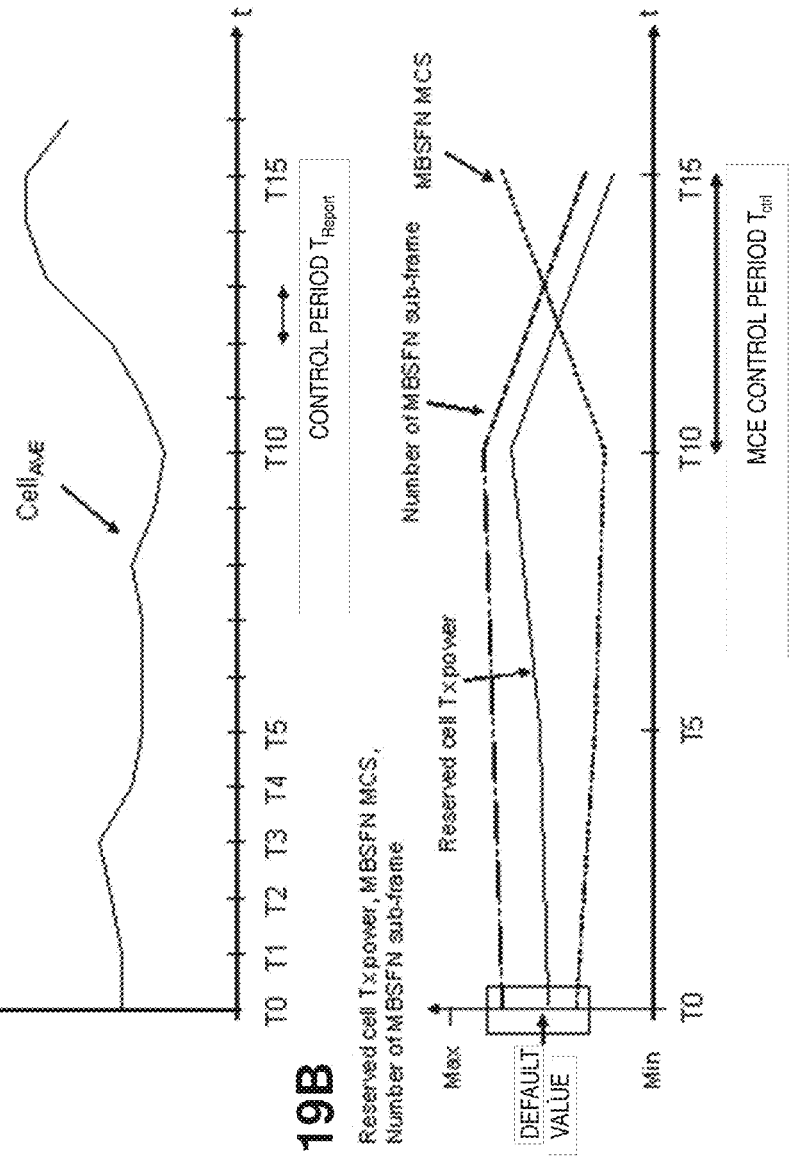
FIGS. 19A and 19B are diagrams showing a change in the PTP traffic volume over time used to determine transmission parameters for an MBSFN area, and the transmission parameters for the MBSFN area determined based on the change, in the first exemplary embodiment of the present invention.

It is assumed that the result of observation of a PTP traffic volume for a given period is as shown in FIG. 19A. In this case, the transmission parameters of the MBSFN and unicast in a reserved cell, which are determined according to the method described above, are as shown in FIG. 19B.

FIG. 19A indicates that, because a time average of the PTP traffic volume at a time t=T10 is slightly lower than that at a time t=T5, a smaller MBSFN MCS is used instead of increasing the number of MBSFN subframes, as shown in FIG. 19B, to increase the transmission power in the reserved cells.

On the other hand, because the PTP traffic volume is increased suddenly at a time t=T15, a larger MBSFN MCS is used instead of significantly decreasing the number of MBSFN subframes and, as a result, the transmission power in the reserved cells is set very low.

In this way, the adaptive control described above is able to support a transmission mode that is optimal for MBSFN and unicast transmission in the MBSFN area in accordance with an ever-changing PTP traffic volume.

In the present embodiment, though the periodic interval Treport at which an eNB notifies the MCE about the PTP traffic volume and the periodic interval Tctrl at which the MCE notifies an eNB about the transmission parameters, are set individually, those two may be set at the same interval.

A trigger-based method may also be used in which the notification is made when at least one or both satisfy the pre-defined condition.

In the embodiment described above, the average of the PTP traffic volumes reported by the eNBs belonging to MBSFN service cells or reserved cells is used. Instead of the average, Representative value that is the largest or smallest at each time, or
Average of the center N values of the values reported by M eNBs (N<M)

may also be used.

Second Exemplary Embodiment

In a second exemplary embodiment of the present invention, based on

PTP traffic volume (load) of reserved cells; and
Target value of MBSFN outage probability, the following are set so that the total system throughput of an MBSFN area is maximized:

Number of MBSFN subframes;
MBSFN MCS; and
Transmission power or maximum of transmission power for MBSFN subframes in a reserved cell.

The difference between the present embodiment and the first exemplary embodiment is that, in the present embodiment, the relation between the PTP traffic volume and the system throughput is derived by expression (1) in advance to create a table that is stored in the memory.

Doing so reduces the amount of calculation in the MCE.

Figure 20:
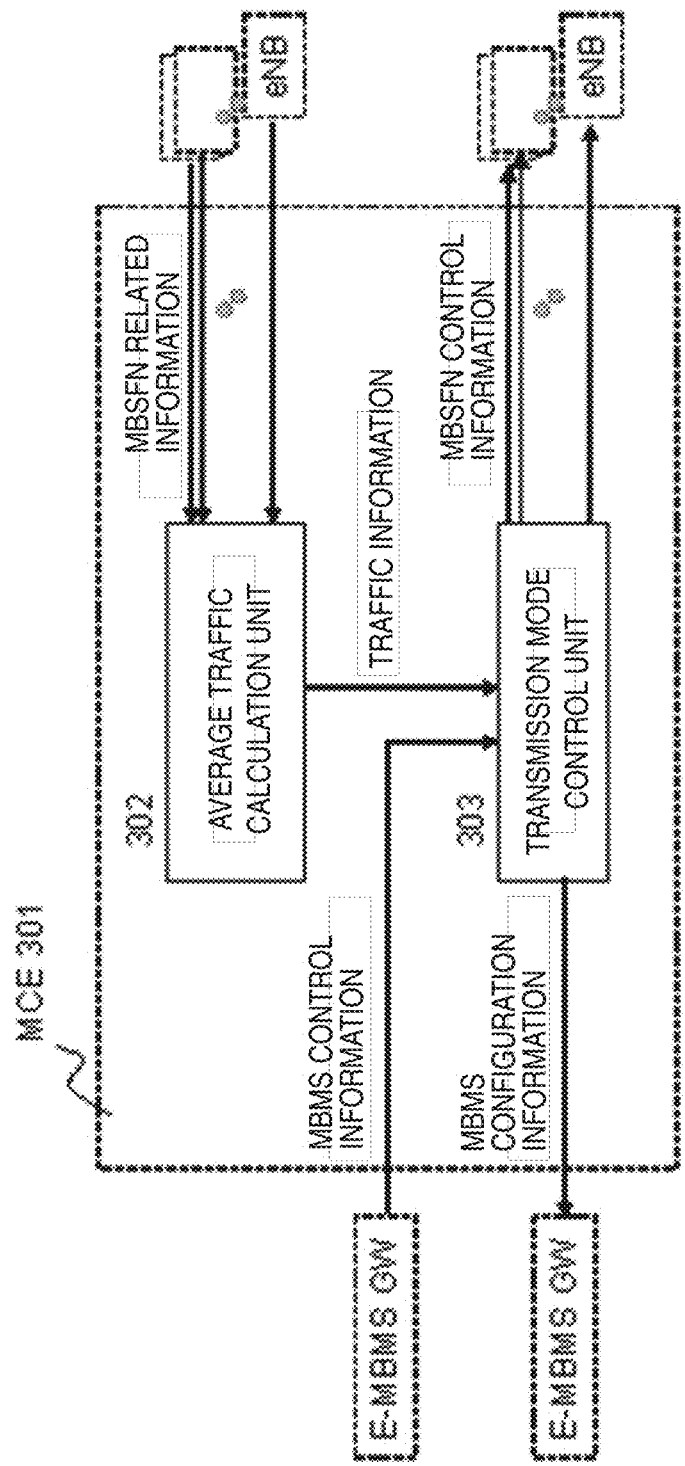
FIG. 20 is a block diagram showing an MCE in the second exemplary embodiment of the present invention.

FIG. 20 is a block diagram showing the configuration of the MCE in the second exemplary embodiment. The configuration of an eNB is the same as that of an eNB in the first exemplary embodiment and so the description is omitted here. In the description below, an MCE 301 is assumed to be connected to one E-MBMS GW and multiple eNBs. The MCE 301 comprises an average traffic calculation unit 302 and a transmission mode control unit 303.

The average traffic calculation unit 302 of the MCE 301 averages reported values of PTP traffic volumes notified by respective eNBs and outputs the averaged result as traffic information.

The transmission mode control unit 303 quantizes the PTP traffic volumes using the traffic information and a table (not shown) that maps a PTP traffic volume to one of the predetermined levels.

And, based on
MBMS control information;
a quantized traffic volume;
a PTP traffic volume prepared for each MBSFN outage probability(%);
MBSFN MCS and the number of MBSFN subframes; and
a table (not shown) indicating the relation of a transmission power or the maximum of the transmission power in a reserved cell, the transmission mode control unit 303 determines the transmission parameters for use in the MBSFN area and transmits the MBMS configuration information to the E-MBMS GW, and the MBSFN control information to eNBs.

Figure 21:
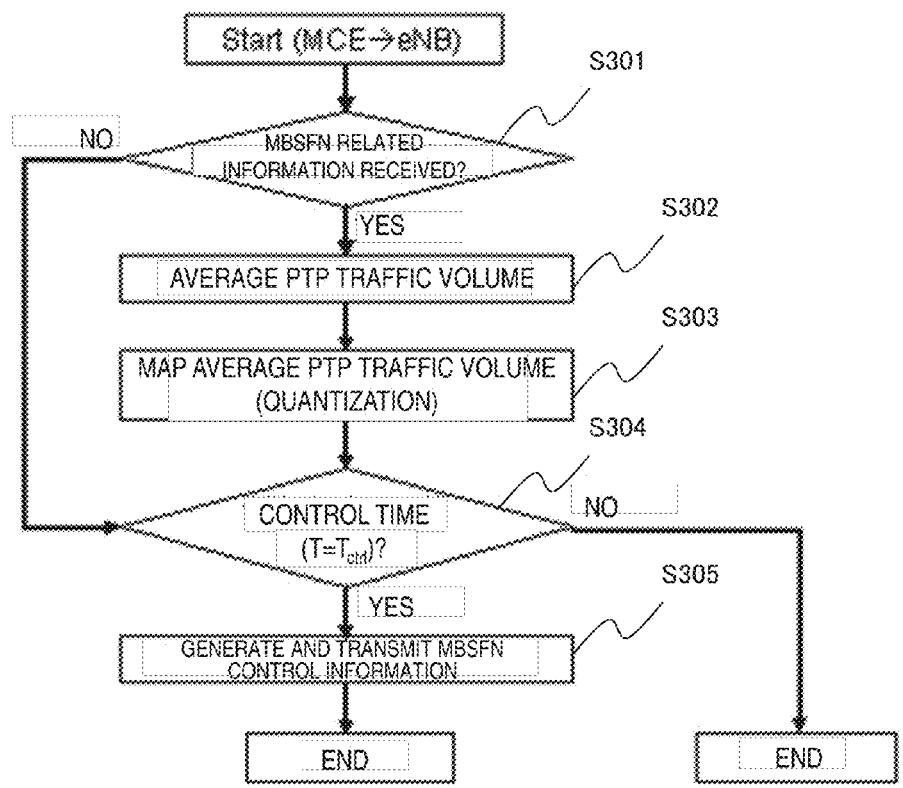
FIG. 21 is a flowchart showing the processing of the MCE in the second exemplary embodiment of the present invention.

FIG. 21 is a flowchart showing the processing of the MCE 301 in FIG. 20.

The MCE notifies base stations about default setting of the transmission parameter of the MBSFN area and then waits for the base stations to report the MBSFN related information including the PTP traffic volume.

If the control time, that is, the MBSFN area transmission parameter update time, has arrived before the MBSFN related information is reported to the average traffic calculation unit 302 (Yes in S304), the transmission mode control unit 303 notifies the base stations about the default setting (or the most recent setting) (S305).

If the MBSFN related information is reported from the base stations (Yes in S301), the average traffic calculation unit 302 calculates a time average of PTP traffic volume by performing a simple moving averaging or a weighted moving averaging, based on the included PTP traffic volume information and PTP traffic volumes previously reported (S302).

And, the average traffic calculation unit 302 maps the PTP traffic volume to one of the predetermined levels based on the time average of the PTP traffic volume and a mapping table created in advance for quantizing the PTP traffic volume (quantization) (S303).

Finally, the transmission mode control unit 303 checks if the control time has arrived (S304) and, if the control time has arrived (Yes in S304), determines the MBSFN area transmission parameter, based on the PTP traffic volume index and the table, which is prepared in advance for each MBSFN outage probability(%) to indicate the relation among the PTP traffic volume, the MBSFN MCS, the number of MBSFN subframes, and the transmission power or the maximum of transmission power in reserved cells, and notifies the base stations about the result.

The following describes the procedure for determining the MBSFN and unicast transmission parameters in the second exemplary embodiment.

In the description below, it is assumed that eNBA1-A3 and eNBB1-B2 belong to the same MBSFN area and exchange information with the MCE, eNBA1-A3 perform both unicast transmission and MBSFN transmission, and eNBB1 and B2 perform only unicast transmission.

The MCE prepares in advance a table, such as the one shown in FIG. 22, for use in mapping the PTP traffic volume to one of several levels (Low, Medium, and High in FIG. 22). If the average PTP traffic is larger than 0 but equal to or smaller than P1, the PTP traffic index is the value 0 indicating "Low"; if the average PTP traffic is larger than P1 but equal to or smaller than P2, the PTP traffic index is the value 1 indicating "Medium"; and if the average PTP traffic is larger than P2, the PTP traffic index is the value 2 indicating "High".

In addition, the table such as the one shown in FIG. 23 is prepared in which the relation among the following is included.

PTP traffic indexes composed of reserved cell PTP traffic indexes and MBSFN service cell PTP traffic indexes;

transmission power or maximum of transmission power in reserved cells,

MBSFN MCS, and

Number of MBSFN subframes.

The values in the table in FIG. 23 are derived by Expression (1) so that the system throughput is maximized for an MBSFN outage probability target (for example, 10%) that is determined.

To use outage targets that are variable, tables are prepared for the target candidate values, one for each.

An eNB in the MBSFN area measures the PTP traffic volume at the period TReport(=T) and notifies the MCE about the measurement result.

The average traffic calculation unit 302 of the MCE time-averages the PTP traffic volumes reported by eNBs in the MBSFN service cells and the PTP traffic volumes reported by eNBs in the reserved cells respectively and, using the table shown in FIG. 22, maps the averaged PTP traffic volume to one of the levels defined in advance.

And, based on the mapped indexes of the PTP traffic volumes, the transmission mode control unit 303 of the MCE, using the table shown in FIG. 23, at the period of Tctrl (for example, Tctrl=5*TReport=5T), determines the following:

MBSFN MCS;

Number of MBSFN subframes; and

Transmission power or the maximum of transmission power for MBSFN subframes in reserved cells For example, when the PTP traffic index of the reserved cell is medium and when the PTP traffic index of MBSFN service cells is low, the transmission mode control unit 303 determines the following:

MBSFN MCS is 2;

the number of MBSFN subframes is 7; and the transmission power or the maximum of transmission power for the MBSFN subframes in reserve cells is 80%.

The MCE notifies each eNB about the determined transmission parameters, and the eNB performs the MBSFN and unicast transmission according to the transmission parameters.

Although the period Treport at which an eNB notifies the MCE about the PTP traffic volume and the period Tctrl at which the MCE notifies an eNB about the transmission parameters are set individually in the present embodiment, the same period may be used.

A trigger-based method may also be used in which the notification is made when at least one or both satisfy the pre-defined condition.

In the above embodiment, interference to the MBSFN transmission is reduced by restricting the transmission power for the MBSFN subframes in a reserved cell.

If it is possible to select a band usable in the frequency domain as in OFDM (Orthogonal Frequency Division Mulitplex) which is the radio access method employed by LTE, it is also possible to reduce interference by restricting the frequency band (resource) usable for MBSFN subframes in a reserved cell, instead of, or in addition to, restricting the transmission power.

Although, in the method described above, the MBSFN quality requirement is that the outage target value is satisfied while keeping the MBSFN transmission rate constant, another method is also possible in which only the outage target value is satisfied, disregarding the MBSFN transmission rate.

In this case, the MBSFN transmission rate may be decreased with priority on an improvement in the PTP system throughput.

In addition, when the requirement is that only the MBSFN transmission rate be kept constant and, under this condition, the PTP traffic volume in the reserved cells is increased, there is another control method in which the MBSFN coverage is reduced by using a larger MBSFN MCS and by decreasing the number of MBSFN subframes.

Although the PTP traffic volume is used in the embodiments described above, the number of terminals performing PTP, or the number of terminals in an active state in the cells, may also be used.

In addition to the PTP traffic volume or the number of terminals in an active state, the number of VoIP terminals, the number of MBSFN receiving terminals or the estimated value of the number of MBSFN receiving terminals, the number of MBSFN reception requesting terminals or the estimated value of the number of MBSFN reception requesting terminals, or the quality (error rate) of executing MBSFN, or the estimated value of the quality (error rate) of executing MBSFN may be used or, instead of the PTP traffic volume or the number of terminals in an active state, the ratio between the number of terminals in an active state and the number of MBSFN receiving terminals may be used.

By causing all the MBSFN receiving terminals (or MBSFN reception requesting terminals) to report that they are receiving (or they are requesting to receive) the MBSFN actually, or causing all the MBSFN receiving terminals to report the received quality, the base station is able to obtain those numerical values. Note that the reports from all the receiving terminals are not always necessary but that the reports may be received from terminals selected with a probability specified by the base station or an upper-level equipment, in which case the base station estimates the actual number of terminals from the number of received reports (number of requests) and the probability. This estimation method is not limited by the most recent reports but the past reports may be used in the estimation. The content of report may be any content as long as the fact that the terminals are receiving (or requesting to receive) MBSFN transmissions, as well as its quality, is known.

Although arranged on the periphery of the MBSFN service cells in the embodiments described above, the reserved cells need not always be on the periphery but may be arranged in such a way that they are surrounded by multiple MBSFN service cells.

As the target values of the MBSFN service quality, not only the MBSFN outage, the MBSFN coverage and the MBSFN service rate (transmission rate) but also the received SIR (Signal-to-Interference) and the received SINR (Signal-to-Interference and Noise power Ratio) may be used.

In the embodiments described above, an example was described in which the MCE receives the multicast related information and the unicast related information from the eNBs in the MBSFN area as the communication status information and in which the transmission parameters for the MBSFN area are determined as the communication control information. It is also possible to determine cell parameters in the MBSFN area.

Although a 3GPP LTE system is assumed in the embodiments described above, the present invention is applicable also to other systems such as 3GPP WCDMA (Wideband Code Division Multiple Access) or WiMAX (Worldwide interoperability for Microwave Access). It is also apparent that the communication status information or the communication control information is not limited to the MBSFN related information or the transmission parameters but that the information on other transmission methods or services or the information on the radio resources used for non-transmission applications may also be used.

The disclosure of the Non-Patent Document given above is hereby incorporated by reference into this specification. The embodiments and the examples may be changed and adjusted in the scope of the entire disclosure (including claims) of the present invention and based on the basic technological concept. In the scope of the claims of the present invention, various disclosed elements may be combined and selected in a variety of ways. That is, it is to be understood that the present invention includes the modifications and changes that may be made by those skilled in the art based on the entire disclosure including the claims and on the technological concept.

The invention claimed is:

1. An eNodeB comprising:
a receiver configured to receive control information from a Multi-cell/multicast Coordination Entity;
a processor configured to determine whether a cell, managed by the eNodeB, is included in a Multimedia Broadcast Multicast service Single Frequency Network (MBSFN) area based on the received control information;
the processor configured to judge the cell is a reserved cell or a non-reserved cell in response to receiving the control information;
a transmitter configured to perform an MBSFN transmission on a resource allocated for the MBSFN transmission, in a case where the cell is included in the MBSFN area and the cell is the non-reserved cell; and
the transmitter configured to perform a transmission for a service other than a Multimedia Broadcast Multicast Service at restricted power or perform a transmission of no signal, on the resource allocated for the MBSFN transmission, in a case where the cell is included in the MBSFN area and the cell is the reserved cell.

2. The eNodeB according to claim 1 wherein,
information indicating the resource allocated for the MBSFN transmission is included in the control information.

3. The eNodeB according to claim 1 wherein,
the transmitter performs a transmission for a service other than a Multimedia Broadcast Multicast Service, on the resource allocated for the MBSFN transmission, in a case where the cell is not included in the MBSFN area.

4. A method, by an eNodeB, comprising:
receiving, by a receiver, control information from a Multi-cell/multicast Coordination Entity;
determining, by a processor, whether a cell, managed by the eNodeB, is included in a Multimedia Broadcast Multicast service Single Frequency Network (MBSFN) area based on the received control information;
judging by the processor, the cell is a reserved cell or a non-reserved cell in response to receiving the control information;
performing, by a transmitter, an MBSFN transmission on a resource allocated for the MBSFN transmission, in a case where the cell is included in the MBSFN area and the cell is the non-reserved cell; and
performing, by the transmitter, a transmission for a service other than a Multimedia Broadcast Multicast Service at restricted power or perform a transmission of no signal, on the resource allocated for the MBSFN transmission, in a case where the cell is included in the MBSFN area and the cell is the reserved cell.

5. The method according to claim 4 wherein,
information indicating the resource allocated for the MBSFN transmission is included in the control information.

6. The method according to claim 4 further comprising,
performing, by the transmitter, a transmission for a service other than a Multimedia Broadcast Multicast Service, on the resource allocated for the MBSFN transmission, in a case where the cell is not included in the MBSFN area.

* * * * *